United States Patent
Sugiura et al.

(10) Patent No.: US 11,602,742 B2
(45) Date of Patent: Mar. 14, 2023

(54) EXHAUST GAS PURIFICATION DEVICE

(71) Applicants: Koji Sugiura, Toyota (JP); Hiromasa Nishioka, Toyota (JP); Naoto Miyoshi, Toyota (JP); Akemi Sato, Toyota (JP); Ryota Nakashima, Kakegawa (JP); Masatoshi Ikebe, Kakegawa (JP); Keisuke Murawaki, Kakegawa (JP); Hirotaka Ori, Kakegawa (JP)

(72) Inventors: Koji Sugiura, Toyota (JP); Hiromasa Nishioka, Toyota (JP); Naoto Miyoshi, Toyota (JP); Akemi Sato, Toyota (JP); Ryota Nakashima, Kakegawa (JP); Masatoshi Ikebe, Kakegawa (JP); Keisuke Murawaki, Kakegawa (JP); Hirotaka Ori, Kakegawa (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 0 days.

(21) Appl. No.: 17/178,336

(22) Filed: Feb. 18, 2021

(65) Prior Publication Data

US 2021/0283589 A1 Sep. 16, 2021

(30) Foreign Application Priority Data

Mar. 12, 2020 (JP) .............................. JP2020-042686

(51) Int. Cl.
*B01J 23/40* (2006.01)
*B01J 23/42* (2006.01)
(Continued)

(52) U.S. Cl.
CPC .......... *B01J 35/04* (2013.01); *B01D 46/2425* (2013.01); *B01D 46/2429* (2013.01);
(Continued)

(58) Field of Classification Search
CPC ... B01J 23/40; B01J 23/42; B01J 23/44; B01J 23/464; B01J 35/0006; B01J 35/04;
(Continued)

(56) References Cited

U.S. PATENT DOCUMENTS 7,695,798 B2  4/2010  Miwa et al.
7,754,160 B2  7/2010  Miyairi et al.
(Continued)

FOREIGN PATENT DOCUMENTS

CN  107073463 A  8/2017
CN  110314683 A  10/2019
(Continued)

OTHER PUBLICATIONS

Sugiura et al., U.S. Appl. No. 16/864,340, Non-Final Office Action dated Oct. 1, 2021.
(Continued)

*Primary Examiner* — Cam N. Nguyen
(74) *Attorney, Agent, or Firm* — Dickinson Wright, PLLC

(57) ABSTRACT

Provided is an exhaust gas purification device that ensures an improved purification performance and a suppressed pressure loss. An exhaust gas purification device of the present disclosure includes a honeycomb substrate and an inflow cell side catalyst layer. disposed on a surface on the inflow cell side in an inflow side region of the partition wall. When a gas permeability coefficient of an inflow side partition wall portion including the inflow side region of the partition wall and the inflow cell side catalyst layer is Ka and a gas permeability coefficient of an outflow side partition wall portion including an outflow side region at least from the predetermined position to an outflow side end of the partition wall is Kb, a ratio Ka/Kb of the gas permeability coefficients is within a range of 0.4 or more and 0.8 or less.

2 Claims, 8 Drawing Sheets

(51) Int. Cl.
   *B01J 23/44* (2006.01)
   *B01J 23/46* (2006.01)
   *B01J 35/00* (2006.01)
   *B01J 35/04* (2006.01)
   *B01D 53/94* (2006.01)
   *B01D 46/24* (2006.01)
   *F01N 3/28* (2006.01)

(52) U.S. Cl.
   CPC .......... *B01D 53/9413* (2013.01); *B01J 23/42* (2013.01); *B01J 23/44* (2013.01); *B01J 23/464* (2013.01); *B01J 35/0006* (2013.01); *F01N 3/2803* (2013.01); *B01D 46/2498* (2021.08); *B01D 2255/1021* (2013.01); *B01D 2255/1023* (2013.01); *B01D 2255/1025* (2013.01); *B01D 2255/9032* (2013.01); *B01D 2255/9155* (2013.01); *B01D 2279/30* (2013.01); *F01N 2330/02* (2013.01); *F01N 2330/30* (2013.01); *F01N 2370/02* (2013.01)

(58) Field of Classification Search
   CPC ............ B01D 53/9413; B01D 46/2429; B01D 46/247; B01D 46/2474; F01N 3/2803
   See application file for complete search history.

(56) References Cited

U.S. PATENT DOCUMENTS

| | | |
|---|---|---|
| 7,867,598 B2 | 1/2011 | Miyairi et al. |
| 7,951,338 B2 | 5/2011 | Miyairi et al. |
| 8,133,841 B2 | 3/2012 | Noda et al. |
| 8,361,592 B2 | 1/2013 | Miyairi et al. |
| 8,609,581 B2 | 12/2013 | Miyairi |
| 8,894,943 B2 | 11/2014 | Mizutani |
| 9,718,026 B2 | 8/2017 | Otsuki |
| 9,849,443 B2 | 12/2017 | Harada |
| 9,932,873 B2 | 4/2018 | Aoki |
| 10,018,095 B2 | 7/2018 | Nomura |
| 10,071,368 B2 | 9/2018 | Onoe |
| 10,076,725 B2 | 9/2018 | Onoe |
| 10,086,363 B2 | 10/2018 | Onoe |
| 10,125,649 B2 | 11/2018 | Onoe |
| 10,159,934 B2 | 12/2018 | Kitamura |
| 10,159,935 B2 | 12/2018 | Onoe |
| 10,183,253 B2 | 1/2019 | Onoe |
| 10,201,805 B2 | 2/2019 | Ohashi |
| 10,344,655 B2 * | 7/2019 | Onoe ............... F01N 3/035 |
| 10,357,744 B2 | 7/2019 | Ohashi |
| 10,369,520 B2 * | 8/2019 | Onoe ............... F01N 3/101 |
| 10,626,765 B2 | 4/2020 | Inoda |
| 10,807,032 B2 | 10/2020 | Tanaka |
| 10,850,269 B2 * | 12/2020 | Tanaka ............... B01J 35/04 |
| 2006/0100101 A1 | 5/2006 | Tsuji et al. |
| 2016/0138448 A1 | 5/2016 | Itoh |
| 2017/0304773 A1 | 10/2017 | Onoe et al. |
| 2019/0301328 A1 | 10/2019 | Yoshioka et al. |
| 2020/0030780 A1 * | 1/2020 | Oishi ............... B01J 27/053 |
| 2020/0276567 A1 | 9/2020 | Onoe et al. |
| 2020/0368735 A1 | 11/2020 | Sugiura et al. |

FOREIGN PATENT DOCUMENTS

| | | |
|---|---|---|
| JP | 2000282852 A | 10/2000 |
| JP | 2003-154223 A | 5/2003 |
| JP | 2007-130624 A | 5/2007 |
| JP | 2008272737 A | 11/2008 |
| JP | 2009022953 A | 2/2009 |
| JP | 4393039 B2 | 10/2009 |
| JP | 2010269205 A | 12/2010 |
| JP | 6386697 B | 8/2018 |
| JP | 2020056381 A | 4/2020 |
| JP | 2020193569 A | 12/2020 |

OTHER PUBLICATIONS

Koji Sugiura et al., Final Office Action dated Apr. 11, 2022 of U.S. Appl. No. 16/864,340.

U.S. Non-Final Office Action dated Jul. 29, 2022, which issued in the corresponding U.S. Appl. No. 16/864,340.

* cited by examiner

EXHAUST GAS PURIFICATION DEVICE

CROSS REFERENCE TO RELATED APPLICATIONS

The present application claims priority from Japanese patent application JP 2020-042686 filed on Mar. 12, 2020, the entire content of which is hereby incorporated by reference into this application.

BACKGROUND

Technical Field

The present disclosure relates to an exhaust gas purification device that includes a catalyst in a filter having a wall flow structure.

Description of Related Art

An exhaust gas discharged from an internal combustion engine in, for example, an automobile contains a Particulate Matter (PM, hereinafter abbreviated as "PM" in some cases) mainly containing carbon, which causes air pollution, an ash as a non-combustible component, and the like. As a filter to trap and remove the PM from the exhaust gas, a filter having a wall flow structure has been widely used.

The filter having the wall flow structure usually includes a honeycomb substrate. The honeycomb substrate includes a porous partition wall defining a plurality of cells extending from an inflow side end surface to an outflow side end surface, and the plurality of cells include inflow cells and outflow cells adjacent to one another and between which the partition wall is interposed. The inflow cell has an open inflow side end and a sealed outflow side end, and the outflow cell has a sealed inflow side end and an open outflow side end. In view of this, the exhaust gas flowed into the inflow cells from the inflow side ends passes through the partition wall to flow into the outflow cells, thus being discharged from the outflow side ends of the outflow cells. When the exhaust gas passes through the partition wall, the PM is trapped inside pores of the partition wall. As examples of the filter having the wall flow structure, a diesel particulate filter (DPF) for diesel engine and a gasoline particulate filter (GPF, hereinafter abbreviated as "GPF" in some cases) for gasoline engine have been known.

Meanwhile, in addition to the PM, the exhaust gas contains harmful components, such as carbon monoxide (CO), hydrocarbons (HC), and nitrogen oxides (NOx). The harmful components can be removed from the exhaust gas by a filter over which a catalyst, such as a noble metal catalyst, is applied. In view of this, recently, to remove both of the PM and the harmful components from the exhaust gas, an exhaust gas purification device including a catalyst in a filter having a wall flow structure has been used.

As an exhaust gas purification device including a catalyst in a filter having a wall flow structure, for example, there has been known an exhaust gas purification device that includes a first catalyst layer disposed on a surface of an inflow cell side of a partition wall, in a length shorter than a whole length of the partition wall along the extending direction of the partition wall from an inflow side end of an exhaust gas, and a second catalyst layer disposed in at least a part of a region inside the partition wall and opposed to the outflow cells, along the extending direction of the partition wall from an outflow side end of the exhaust gas (Japanese Patent No. 6386697).

SUMMARY

However, in the exhaust gas purification device described in Japanese Patent No. 6386697, when density of the first catalyst layer disposed on the surface of the inflow cell side of the partition wall is increased to improve a purification performance, the exhaust gas flowing in from the inflow side end to the inflow cell has an excessively decreased speed to pass through an inflow side partition wall portion including the partition wall and the first catalyst layer, and the exhaust gas has an excessively increased speed to flow along the first catalyst layer of the partition wall. Thus, it becomes difficult to bring the exhaust gas in contact with the first catalyst layer such that the exhaust gas is efficiently purified, and a pressure loss may be increased. On the other hand, when density of the second catalyst layer disposed in at least a part of the region inside the partition wall and opposed to the outflow cell is increased, the speed to pass through the inflow side partition wall portion including the partition wall and the first catalyst layer is excessively increased, and the exhaust gas has an excessively decreased speed to flow along the first catalyst layer of the partition wall. Thus, it may become difficult to bring the exhaust gas in contact with the first catalyst layer such that the exhaust gas is efficiently purified.

The present disclosure has been made in view of such points, and the present disclosure provides an exhaust gas purification device that ensures an improved purification performance and a suppressed pressure loss.

In order to solve the above-described problem, an exhaust gas purification device of the present disclosure comprises a honeycomb substrate and an inflow cell side catalyst layer. The honeycomb substrate includes a porous partition wall that defines a plurality of cells extending from an inflow side end surface to an outflow side end surface. The plurality of cells include an inflow cell and an outflow cell adjacent to one another with the partition wall interposed therebetween. The inflow cell has an open inflow side end and a sealed outflow side end. The outflow cell has a sealed inflow side end and an open outflow side end. The inflow cell side catalyst layer is disposed on a surface on the inflow cell side in an inflow side region from the inflow side end to a predetermined position on an outflow side of the partition wall. When a gas permeability coefficient of an inflow side partition wall portion including the inflow side region of the partition wall and the inflow cell side catalyst layer is Ka and a gas permeability coefficient of an outflow side partition wall portion including at least an outflow side region from the predetermined position to the outflow side end of the partition wall is Kb, a ratio Ka/Kb of the gas permeability coefficients is within a range of 0.4 or more and 0.8 or less.

EFFECT

The present disclosure ensures an improved purification performance and a suppressed pressure loss.

BRIEF DESCRIPTION OF THE DRAWINGS

FIG. 8 further includes graphs, upper portion on the right side of which is a graph illustrating flow rates of $CH_4$ and $O_2$ and bed temperatures at the respective positions in the flow direction of the supply gas of the reactor in which a Pt-containing catalyst is disposed, middle portion on the right side of which is a graph illustrating flow rates of $H_2$ and CO at the respective positions in the flow direction of the supply gas of the reactor in which the Pt-containing catalyst is disposed, and lower portion on the right side of which is a graph illustrating flow rates of $H_2O$ and $CO_2$ at the respective positions in the flow direction of the supply gas of the reactor in which the Pt-containing catalyst is disposed.

DETAILED DESCRIPTION OF THE EMBODIMENTS

An embodiment according to an exhaust gas purification device of the present disclosure is an exhaust gas purification device that includes a honeycomb substrate and an inflow cell side catalyst layer. The honeycomb substrate includes a porous partition wall that defines a plurality of cells extending from an inflow side end surface to an outflow side end surface. The plurality of cells include an inflow cell and an outflow cell adjacent to one another with the partition wall interposed therebetween. The inflow cell has an open inflow side end and a sealed outflow side end. The outflow cell has a sealed inflow side end and an open outflow side end. The inflow cell side catalyst layer is disposed on a surface on the inflow cell side in an inflow side region from the inflow side end to a predetermined position on an outflow side of the partition wall. When a gas permeability coefficient of an inflow side partition wall portion including the inflow side region of the partition wall and the inflow cell side catalyst layer is Ka and a gas permeability coefficient of an outflow side partition wall portion including at least an outflow side region from the predetermined position to the outflow side end of the partition wall is Kb, a ratio Ka/Kb of the gas permeability coefficients is within a range of 0.4 or more and 0.8 or less. Here, the "inflow side" means a side from which an exhaust gas flows into the exhaust gas purification device and the "outflow side" means a side from which the exhaust gas flows out in the exhaust gas purification device.

In the embodiment, while the extending direction of the partition wall is not specifically limited, the extending direction is usually approximately the same as the axial direction of the honeycomb substrate, and while the extending direction of the cell is not specifically limited, the extending direction is usually approximately the same as the extending direction of the partition wall. In the following description, the "extending direction" means the extending directions of the partition wall and the cell, that is, the direction in which the inflow side and the outflow side are opposed, and means the direction approximately the same as the axial direction of the honeycomb substrate. The following describes a first embodiment and a second embodiment as the embodiments.

I. First Embodiment

An exhaust gas purification device of a first embodiment includes an outflow cell side catalyst layer in an inner region of the outflow cell side in the outflow side region of the partition wall, and the outflow side partition wall portion includes the outflow side region of the partition wall and the outflow cell side catalyst layer.

Figure 1:
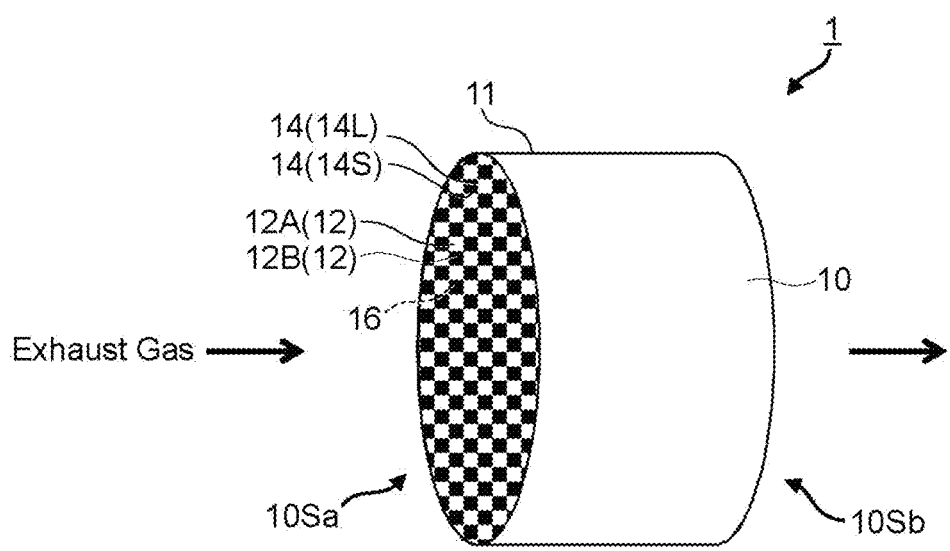
FIG. 1 is a perspective view schematically illustrating an exhaust gas purification device of a first example according to an embodiment.
Figure 2:
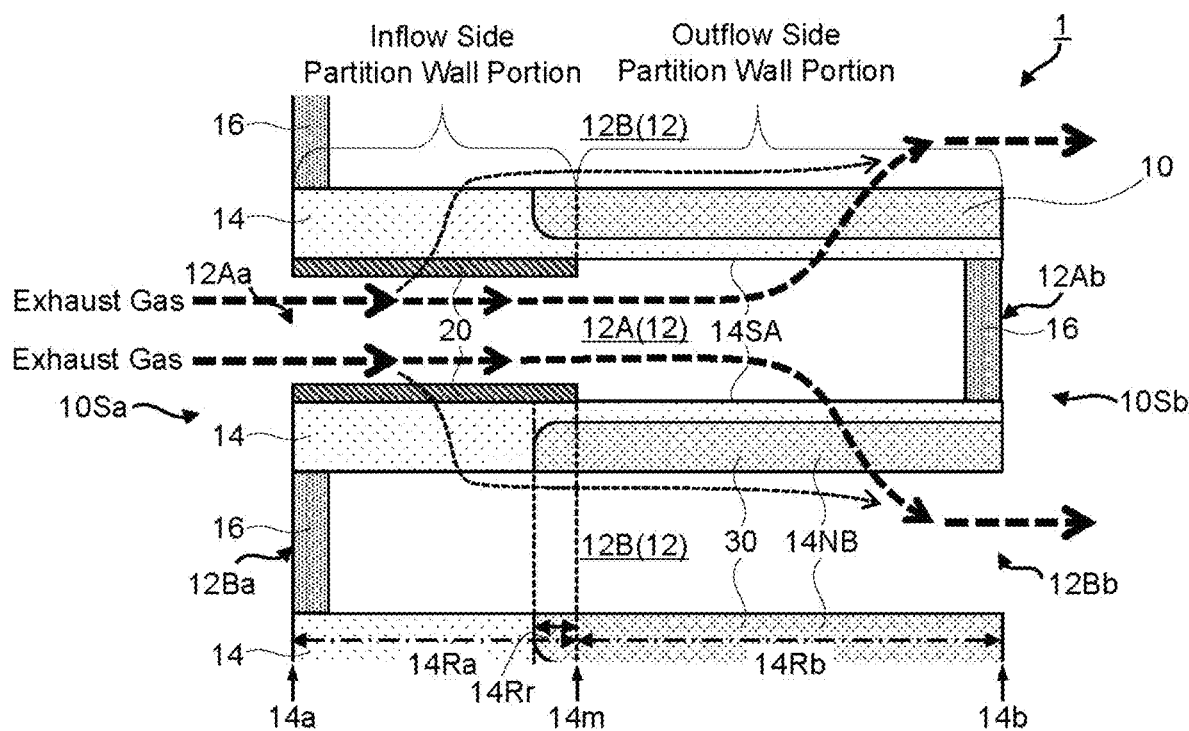
FIG. 2 is a cross-sectional view schematically illustrating a main part of a cross-sectional surface parallel to the extending direction of a cell in the exhaust gas purification device of the first example according to the embodiment.

First, the following describes an outline of the exhaust gas purification device according to the first embodiment with examples. Here, FIG. 1 is a perspective view schematically illustrating the exhaust gas purification device of a first example according to the embodiment. FIG. 2 is a cross-sectional view schematically illustrating a main part on a cross-sectional surface parallel to the extending direction of the cell in the exhaust gas purification device of the first example according to the embodiment.

As illustrated in FIG. 1 and FIG. 2, an exhaust gas purification device 1 of the first example includes a honeycomb substrate 10, sealing portions 16, inflow cell side catalyst layers 20, and outflow cell side catalyst layers 30. The honeycomb substrate 10 is a substrate in which a cylindrical-shaped frame portion 11 and partition walls 14 partitioning a space inside the frame portion 11 into a honeycomb shape are integrally formed. The partition walls 14 are porous bodies that define a plurality of cells 12 extending from an inflow side end surface 10Sa to an outflow side end surface 10Sb of the honeycomb substrate 10. The partition wall 14 includes a plurality of wall portions 14L arranged separated from and parallel to one another such that cross-sectional surfaces perpendicular to the extending direction of the plurality of cells 12 have square shapes, and a plurality of wall portions 14S orthogonal to the plurality of wall portions 14L and arranged separated from and parallel to one another. A cross-sectional surface of the partition wall 14 perpendicular to the extending direction has a grid shape.

The plurality of cells 12 include inflow cells 12A and outflow cells 12B adjacent to one another and between which the partition wall 14 is interposed. The inflow cell 12A has an open inflow side end 12Aa and an outflow side end 12Ab sealed by the sealing portion 16. The outflow cell 12B has an inflow side end 12Ba sealed by the sealing portion 16 and an open outflow side end 12Bb.

The inflow cell side catalyst layer 20 is disposed on a surface 14SA on the inflow cell side in an inflow side region 14Ra from an inflow side end 14a to a predetermined position 14m on the outflow side of the partition wall 14. The inflow cell side catalyst layer 20 includes catalyst metal particles (not illustrated) having platinum (Pt) and a carrier (not illustrated) that supports them. The inflow cell side catalyst layer 20 has a content of a catalytic metal and the like adjusted so as to obtain a necessary purification performance and also has properties and the like, such as its density, thickness, average grain diameters of the carrier and a cocatalyst, and porosity, adjusted such that a ratio Ka/Kb of gas permeability coefficients described later falls within a range of 0.4 or more and 0.8 or less.

The outflow cell side catalyst layer 30 is disposed in an inner region 14NB on the outflow cell side in an outflow side region 14Rb from the predetermined position 14m to an outflow side end 14b of the partition wall 14 and in an overlapping region 14Rr that extends to the inflow side from the predetermined position 14m and overlaps the inflow side region 14Ra. The outflow cell side catalyst layer 30 includes catalyst metal particles (not illustrated) having rhodium (Rh) and a carrier (not illustrated) that supports them. The outflow cell side catalyst layer 30 has a content of the catalytic metal and the like adjusted so as to obtain a necessary purification performance and also has properties and the like, such as its density, thickness, average grain diameters of the carrier and a cocatalyst, and porosity, adjusted such that the ratio Ka/Kb of gas permeability coefficients described later falls within a range of 0.4 or more and 0.8 or less.

When a gas permeability coefficient of the inflow side partition wall portion including the inflow side region 14Ra of the partition wall 14 and the inflow cell side catalyst layer 20 is Ka and a gas permeability coefficient of the outflow side partition wall portion including the outflow side region 14Rb of the partition wall 14 and the outflow cell side catalyst layer 30 is Kb, the ratio Ka/Kb of the gas permeability coefficients is within the range of 0.4 or more and 0.8 or less.

When, in order to improve the purification performance, the gas permeability coefficient Ka is decreased by increasing the density of the inflow cell side catalyst layer 20 to decrease the ratio Ka/Kb of the gas permeability coefficients to lower than 0.4, a speed of the exhaust gas, which has flowed in from the inflow side end 14a to the inflow cell 12A, passing through the inflow side partition wall portion is excessively decreased to excessively increase a speed of the exhaust gas flowing along the inflow cell side catalyst layer 20. This causes a difficulty in bringing the exhaust gas into contact with the inflow cell side catalyst layer 20 such that the exhaust gas is efficiently purified, and a pressure loss is increased. Furthermore, the excessively increased speed of the exhaust gas passing through the outflow side partition wall portion may cause a difficulty in bringing the exhaust gas into contact with the outflow cell side catalyst layer 30 such that the exhaust gas is efficiently purified. Meanwhile, when the gas permeability coefficient Kb is decreased by increasing the density of the outflow cell side catalyst layer 30 to increase the ratio Ka/Kb of the gas permeability coefficients to more than 0.8, a speed of the exhaust gas, which has been flowed in from the inflow side end 14a to the inflow cell 12A, passing through the inflow side partition wall portion is excessively increased even in a range where the gas permeability coefficient Ka does not exceed the gas permeability coefficient Kb, and the speed of the exhaust gas flowing along the inflow cell side catalyst layer 20 is excessively decreased. This causes a difficulty in bringing the exhaust gas into contact with the inflow cell side catalyst layer 20 such that the exhaust gas is efficiently purified. Furthermore, the excessively decreased speed of the exhaust gas passing through the outflow side partition wall portion may increase the pressure loss and cause a difficulty in bringing the exhaust gas into contact with the outflow cell side catalyst layer 30 such that the exhaust gas is efficiently purified.

In contrast to this, in the exhaust gas purification device 1 of the first example, the speed of the exhaust gas, which has flowed in from the inflow side end 14a to the inflow cell 12A, passing through the inflow side partition wall portion and the speed of the exhaust gas flowing along the inflow cell side catalyst layer 20, and the speed of the exhaust gas passing through the outflow side partition wall portion are adjusted to be in a desired range by causing the ratio Ka/Kb of the gas permeability coefficients to fall within the range of 0.4 or more and 0.8 or less, thereby ensuring bringing the exhaust gas into contact with the inflow cell side catalyst layer 20 and the outflow cell side catalyst layer 30 such that the exhaust gas is efficiently purified and ensuring a suppressed pressure loss.

Therefore, in the exhaust gas purification device of the first embodiment, similarly to the first example, adjusting the flow of the exhaust gas in the exhaust gas purification device by causing the ratio Ka/Kb of the gas permeability coefficients to fall in the range of 0.4 or more and 0.8 or less ensures an improved purification performance and a suppressed pressure loss.

Subsequently, each configuration of the exhaust gas purification device of the first embodiment is described in detail.

1. Ratio Ka/Kb of Gas Permeability Coefficients

When the gas permeability coefficient of the inflow side partition wall portion including the inflow side region of the partition wall and the inflow cell side catalyst layer is Ka and the gas permeability coefficient of the outflow side partition wall portion including the outflow side region of the partition wall and the outflow cell side catalyst layer is Kb, the ratio Ka/Kb of the gas permeability coefficients is within the range of 0.4 or more and 0.8 or less.

Here, the "gas permeability coefficient" means a Darcy permeability coefficient and indicates a coefficient calculated in the following formula.

$$K = QVT/AM \qquad \text{[Math. 1]}$$

(where, K=gas permeability coefficient ($m^2$), Q=flow rate of gas (unit: $m^3$/sec), V=viscosity of gas (unit: Pa·sec), T=thickness of partition wall portion (unit: m), A=cross-sectional area perpendicular to gas passing direction of part through which gas passes in partition wall portion (unit: $m^2$), M=differential pressure between gas inflow side and outflow side of partition wall portion when gas passes through partition wall portion at flow rate Q (unit: Pa))

While a measuring method of the gas permeability coefficient is not specifically limited, examples of the method include, for example, a method that measures a flow rate of an air when a differential pressure between the gas inflow side and outflow side of the partition wall portion becomes 10 kPa, and calculates the coefficient from the formula using the measured flow rate of the air when a 25° C. air is passed through a 10 mm-square part (a part in the partition wall portion through which the gas passes) of the partition wall portion at a flow rate of 1 L/min to 200 L/min while changing the gas pressure using, for example, a commercially available perm porometer (for example, a perm porometer manufactured by Porous Materials Inc. (PMI)).

The gas permeability coefficient Ka indicates a coefficient obtained from the flow rate of the gas when the gas is passed through the inflow side partition wall portion and the differential pressure between the gas inflow side and outflow side of the inflow side partition wall portion. The gas permeability coefficient Kb indicates a coefficient obtained from the flow rate of the gas when the gas is passed through the outflow side partition wall portion and the differential pressure between the gas inflow side and outflow side of the outflow side partition wall portion.

The ratio Ka/Kb of the gas permeability coefficients is not specifically limited as long as it is within the range of 0.4 or more and 0.8 or less. The ratio Ka/Kb is within a range of 0.5 or more and 0.7 or less in some embodiments. It is because when the ratio Ka/Kb of the gas permeability coefficients is equal to or more than the lower limit of these ranges, the excessively decreased speed of the exhaust gas passing through the inflow side partition wall portion and the excessively increased speed of the exhaust gas passing through the outflow side partition wall portion are suppressed, and the flow of the exhaust gas in the exhaust gas purification device can be effectively adjusted. It is because when the ratio Ka/Kb of the gas permeability coefficients is equal to or less than the upper limit of these ranges, the excessively increased speed of the exhaust gas passing through the inflow side partition wall portion and the excessively decreased speed of the exhaust gas passing through the outflow side partition wall portion are suppressed, and the flow of the exhaust gas in the exhaust gas purification device can be effectively adjusted.

The gas permeability coefficient Ka is not specifically limited. For example, the gas permeability coefficient Ka is within a range of $1.0E-16\ m^2$ or more and $1.0E-13\ m^2$ or less in some embodiments, and the gas permeability coefficient Ka may be within a range of $1.0E-15\ m^2$ or more and $5.0E-14\ m^2$ or less in some embodiments. It is because when the gas permeability coefficient Ka is equal to or more than the lower limit of these ranges, the excessively decreased speed of the exhaust gas passing through the inflow side partition wall portion can be suppressed. It is because when the gas permeability coefficient Ka is equal to or less than the upper limit of these ranges, the excessively increased speed of the exhaust gas passing through the inflow side partition wall portion can be suppressed.

While an adjustment method of the gas permeability coefficient Ka is not specifically limited and a common method can be used, examples of the method include, for example, a method that adjusts the gas permeability coefficient of the inflow cell side catalyst layer by preparing properties and the like, such as a density, a thickness, average grain diameters of the carrier and the cocatalyst, and porosity of the inflow cell side catalyst layer, a method that disposes a layer that obstructs pores of the partition wall on a surface on the inflow cell side in the inflow side region of the partition wall, and a method that adjusts the gas permeability coefficient in the inflow side region of the partition wall by preparing properties and the like, such as porosity of the partition wall.

The gas permeability coefficient Kb is not specifically limited. For example, the gas permeability coefficient Kb is within a range of $2.0E-16\ m^2$ or more and $2.0E-13\ m^2$ or less in some embodiments, and the gas permeability coefficient Kb may be within a range of $2.0E-15\ m^2$ or more and $1.0E-13\ m^2$ or less in some embodiments. It is because when the gas permeability coefficient Kb is equal to or more than the lower limit of these ranges, the excessively decreased speed of the exhaust gas passing through the outflow side partition wall portion can be suppressed. It is because when the gas permeability coefficient Kb is equal to or less than the upper limit of these ranges, the excessively increased speed of the exhaust gas passing through the outflow side partition wall portion can be suppressed.

While an adjustment method of the gas permeability coefficient Kb is not specifically limited and a common method can be used, examples of the method include, for example, a method that adjusts the gas permeability coefficient of the outflow cell side catalyst layer by preparing properties and the like, such as a density, a thickness, average grain diameters of the carrier and the cocatalyst, and porosity of the outflow cell side catalyst layer, and a method that adjusts the gas permeability coefficient in the outflow side region of the partition wall by preparing properties and the like, such as porosity of the partition wall.

A length in the extending direction of the inflow side partition wall portion corresponds to a length in the extending direction of the inflow side region of the partition wall, that is, a length in the extending direction from the inflow side end to the predetermined position on the outflow side of the partition wall, and a length in the extending direction of the inflow cell side catalyst layer. A length in the extending direction of the outflow side partition wall portion is a length obtained by subtracting the length in the extending direction of the inflow side partition wall portion from a whole length in the extending direction of the partition wall. Note that the length in the extending direction of the outflow side partition wall portion corresponds to a length in the extending direction of the outflow side region of the partition wall.

The length in the extending direction of the inflow side partition wall portion is not specifically limited. For example, the length is within a range of 1/100 or more and 90/100 or less of the whole length in the extending direction of the partition wall in some embodiments, and the length may be within a range of 1/100 or more and 20/100 or less of the whole length in the extending direction of the partition wall in some embodiments. It is because the length equal to or more than the lower limit of these ranges ensures achieving an improved purification performance by making a period of the exhaust gas in contact with the inflow cell side catalyst layer long enough even in a situation where the flow rate of the exhaust gas is large under an operation condition with a high load. It is because the length equal to or less than the upper limit of these ranges ensures effectively suppressing the pressure loss, and ensures securing a length that exceeds an expected deposition thickness of ash as a length in the extending direction of a region where the inflow cell side catalyst layer is not disposed in the partition wall.

2. Inflow cell Side Catalyst Layer

The inflow cell side catalyst layer is disposed on the surface on the inflow cell side in the inflow side region from the inflow side end to the predetermined position on the outflow side of the partition wall. This causes the inflow cell side catalyst layer to obstruct the pores facing the inflow cell of the inflow side region of the partition wall, and the gas permeability coefficient of the inflow side partition wall portion including the inflow side region of the partition wall and the inflow cell side catalyst layer to be lower than the outflow side partition wall portion including the outflow side region of the partition wall and the outflow cell side catalyst layer.

Here, "the predetermined position on the outflow side of the partition wall" indicates a position closer to the outflow side end than the inflow side end of the partition wall. Also, "disposed on the surface on the inflow cell side in the inflow side region from the inflow side end to the predetermined position on the outflow side of the partition wall" indicates that it is disposed to be in contact with the surface on the inflow cell side in the inflow side region of the partition wall in an outside of the partition wall.

The length in the extending direction of the inflow side region of the partition wall, that is, the length in the extending direction from the inflow side end to the predetermined position of the partition wall, and the length in the extending direction of the inflow cell side catalyst layer correspond to the length in the extending direction of the inflow side partition wall portion.

The density of the inflow cell side catalyst layer is not specifically limited, and a common density can be used. For example, the density is within a range of 30 g/L or more and 350 g/L or less in some embodiments, the density may be within a range of 50 g/L or more and 300 g/L or less, and the density may also be within a range of 50 g/L or more and 250 g/L or less in some embodiments. It is because the density equal to or more than the lower limit of this range facilitates improving the purification performance. It is because the density equal to or less than the upper limit of this range facilitates suppressing the pressure loss. Note that "the density of the inflow cell side catalyst layer" indicates a value obtained by dividing a mass of the inflow cell side catalyst layer by a volume of a part in the axial direction of the honeycomb substrate having the same axial direction length as the length in the extending direction of the inflow cell side catalyst layer.

A thickness of the inflow cell side catalyst layer is not specifically limited, and a common thickness can be used. For example, the thickness is within a range of 5% or more and 100% or less of a thickness of the partition wall in some embodiments, and the thickness may be within a range of 10% or more and 40% or less in some embodiments. It is because the thickness equal to or more than the lower limit of this range facilitates suppressing the excessively increased speed of the exhaust gas passing through the inflow side partition wall portion. It is because the thickness equal to or less than the upper limit of this range facilitates suppressing the excessively decreased speed of the exhaust gas passing through the inflow side partition wall portion.

While the inflow cell side catalyst layer is not specifically limited as long as it includes a catalytic metal, it usually includes catalyst metal particles and a carrier that supports the catalytic metal particles. The inflow cell side catalyst layer is, for example, a porous sintered body of a carrier with catalyst that supports the catalyst metal particles.

While a material of the catalytic metal is not specifically limited, and a common material can be used, examples of the material includes a noble metal, such as rhodium (Rh), palladium (Pd), and platinum (Pt). The material of the catalytic metal may be one metal or two or more metals, or may be an alloy that contains two or more metals. The material of the catalytic metal is at least one of Pt, Pd, and the like in some embodiments, and the material may be Pt in some embodiments.

An average grain diameter of the catalyst metal particles is not specifically limited, and a common average grain diameter can be used. For example, the average grain diameter is within a range of 0.1 nm or more and 20 nm or less in some embodiments. It is because the average grain diameter equal to or less than the upper limit of this range ensures increasing a contacted area with the exhaust gas. Note that the average grain diameter of the catalyst metal particle indicates, for example, an average value obtained from a grain diameter measured with a transmission electron microscope (TEM).

A content of the catalytic metal per 1 L of volume of a substrate is not specifically limited, and a common content can be used. The content differs depending on the material of the catalytic metal, and, for example, when the material is Pd, Pt, or Rh, the content is within the range of 0.05 g or more and 5 g or less in some embodiments. It is because the content equal to or more than the lower limit of this range ensures obtaining sufficient catalytic action, and the content equal to or less than the upper limit of this range ensures suppressing a grain growth of the catalytic metal simultaneously with an advantage in cost. Here, "the content of the catalytic metal per 1 L of volume of the substrate" indicates a value obtained by dividing a mass of the catalytic metal contained the inflow cell side catalyst layer by a volume of a part in the axial direction of the honeycomb substrate having the same axial direction length as the length in the extending direction of the inflow cell side catalyst layer.

A material of the carrier is not specifically limited, and a common material can be used, examples of the material include, for example, a metallic oxide, such as alumina ($Al_2O_3$), zirconia ($ZrO_2$), ceria ($CeO_2$), silica ($SiO_2$), magnesia (MgO), and titanium oxide ($TiO_2$), or, for example, a solid solution of them, such as a ceria-zirconia ($CeO_2$—$ZrO_2$) composite oxide. The material of the carrier may be one or two or more among them. The material of the carrier is at least one of, for example, alumina, ceria-zirconia composite oxide, and the like, in some embodiments. While a shape of the carrier is not specifically limited, and a common shape can be used, it is in powder form in some embodiments. It is because a larger specific surface area can be secured.

An average grain diameter of the carrier in powder form is not specifically limited. For example, the average grain diameter is within a range of 0.1 μm or more and 20 μm or less, and the average grain diameter may be within a range of 1 μm or more and 10 μm or less in some embodiments. It is because the average grain diameter equal to or more than the lower limit of this range, in addition to ensuring obtaining a sufficient heat resistant property and suppressing a slurry from penetrating in the inner region of the partition wall when the slurry containing the carrier in powder form is supplied on the surface of the partition wall in order to form the inflow cell side catalyst layer, facilitates suppressing the excessively decreased speed of the exhaust gas passing through the inflow side partition wall portion. It is because the average grain diameter equal to or less than the upper limit of this range, in addition to ensuring improving a purification performance by sufficiently securing dispersibility of the catalyst metal particles, facilitates suppressing the excessively increased speed of the exhaust gas passing through the inflow side partition wall portion. Note that "the average grain diameter of the carrier in powder form" means, for example, the average grain diameter obtained by a laser diffraction and scattering method.

A mass ratio of the catalyst metal particles to a total mass of the catalyst metal particles and the carrier is not specifically limited, and a common mass ratio can be used. For example, the mass ratio is within a range of 0.01% by mass or more and 10% by mass or less in some embodiments. It is because the mass ratio equal to or more than the lower limit of this range ensures obtaining the sufficient catalytic action and it is because the mass ratio equal to or less than the upper limit of this range ensures suppressing a grain growth of the catalyst metal particle simultaneously with the advantage in cost.

While a method that causes the carrier to support the catalyst metal particles is not specifically limited, and a common method can be used, examples of the method include, for example, a method that dries and fires the carrier after immersing the carrier in an aqueous solution containing a catalytic metal salt (such as nitrate) or a catalytic metal complex (such as tetraammine complex).

The inflow cell side catalyst layer may include a cocatalyst that does not support the catalyst metal particles besides the catalyst metal particles and the carrier. While a material of the cocatalyst is not specifically limited, and a common material can be used, examples of the material include alumina, silica, and ceria-zirconia composite oxide. While a shape of the cocatalyst is not specifically limited, and a common shape can be used, it is in powder form in some embodiments. A mass ratio of the cocatalyst to a total mass of the catalyst metal particles, the carrier, and the cocatalyst is not specifically limited, and a common mass ratio can be used. For example, the mass ratio is within a range of 30% by mass or more and 80% by mass or less in some embodiments. An average grain diameter of the cocatalyst in powder form is similar to the average grain diameter of the carrier in powder form, and therefore, a description is omitted here.

While a forming method of the inflow cell side catalyst layer is not specifically limited, and a common method can be used, examples of the method include, for example, a method that dries and fires a slurry after supplying the slurry on the surface on the inflow cell side in the inflow side region of the partition wall.

While the slurry is not specifically limited as long as it contains a catalytic metal besides a solvent, usually, it contains the catalyst metal particles and the carrier. While the solvent is not specifically limited, and a common solvent can be used, examples of the solvent include, for example, water, such as ion exchanged water, a water-soluble organic solvent, and a mixture of the water and the water-soluble organic solvent. The slurry may further contain any ingredients as necessary, such as a cocatalyst, an oxygen absorption/emission material, a binder, and an additive.

The average grain diameters and the like of the carrier and the cocatalyst in powder form contained in the slurry and properties and the like, such as a solid content concentration and viscosity, of the slurry can be appropriately adjusted such that the slurry does not penetrate in the inner region of the partition wall and the gas permeability coefficient Ka of the inflow side partition wall portion falls within the desired range.

While the method that supplies the slurry on the surface on the inflow cell side in the inflow side region of the partition wall is not specifically limited, and a common method can be used, examples of the method include, for example, a method that immerses the honeycomb substrate in the slurry from an inflow side end surface side and takes it out from the slurry after an elapse of a predetermined period. In this method, the outflow cell may be pressurized from the outflow side end side to generate a pressure difference between the outflow cell and the inflow cell such that the slurry does not penetrate in the inner region of the partition wall.

In the method that dries and fires the slurry after supplying the slurry on the surface on the inflow cell side in the inflow side region of the partition wall, a drying condition is not specifically limited. The drying condition is affected by shape and dimension of the honeycomb substrate or the carrier, for example, the drying condition is a condition in which the drying is performed at a temperature within a range of 80° C. or more and 300° C. or less for a period within a range of one hour or more and ten hours or less in some embodiments. A firing condition is not specifically limited. For example, the firing condition is a condition in which the firing is performed at a temperature within a range of 400° C. or more and 1000° C. or less for a period within a range of one hour or more and four hours or less in some embodiments.

Note that properties and the like, such as a density, a thickness, and porosity, of the inflow cell side catalyst layer can be prepared by a supply amount of the slurry, a shape, an average grain diameter, and a content of each ingredient, such as the catalyst metal particles, the carrier, and the cocatalyst, contained in the slurry, properties of the slurry, the drying condition, the firing condition, and the like.

3. Outflow Cell Side Catalyst Layer

The outflow cell side catalyst layer is disposed in the inner region on the outflow cell side in the outflow side region of the partition wall.

Here, "disposed in the inner region on the outflow cell side in the outflow side region of the partition wall" indicates that it is disposed in a region opposed to the outflow cells inside the outflow side region of the partition wall.

While the outflow cell side catalyst layer is not specifically limited as long as it is disposed in the inner region on the outflow cell side in the outflow side region of the partition wall, for example, it is usually disposed in the inner region on the outflow cell side in the outflow side region of the partition wall and the overlapping region that extends to the inflow side from the predetermined position of the partition wall and overlaps the inflow side region, as with the outflow cell side catalyst layer 30 illustrated in FIG. 2. It is because it can suppress the exhaust gas from passing through a part without the catalyst layer to be discharged without being purified.

The length in the extending direction of the outflow side region of the partition wall, that is, a length in the extending direction from the predetermined position to the outflow side end of the partition wall, corresponds to the length in the extending direction of the outflow side partition wall portion. A length in the extending direction of the outflow cell side catalyst layer corresponds to the length in the extending direction of the outflow side region when the outflow cell side catalyst layer is disposed only in the outflow side region of the partition wall, but when the outflow cell side catalyst layer is disposed in the outflow side region of the partition wall and the overlapping region, the length in the extending direction of the outflow cell side catalyst layer corresponds to a total length in the extending direction of the outflow side region of the partition wall and the overlapping region.

The length in the extending direction of the overlapping region of the partition wall in this case is not specifically limited. For example, the length is within a range of 2/100 or more and 60/100 or less of the whole length in the extending direction of the partition wall in some embodiments, the length may be within a range of 5/100 or more and 50/100 or less of the whole length in the extending direction of the partition wall in some embodiments, and the length may also be within a range of 5/100 or more and 20/100 or less of the whole length in the extending direction of the partition wall in some embodiments. It is because the lengths equal to or more than the lower limit of these range ensures effectively suppressing the exhaust gas from passing through the part without the catalyst layer. It is because the lengths equal to or less than the upper limit of these range decreases the effect of the decreased speed of the exhaust gas passing through the overlapping region of the partition wall, thereby ensuring suppressing the purification performance from being reduced and the pressure loss from increasing.

A density of the outflow cell side catalyst layer is not specifically limited, and a common density can be used. For example, the density is within a range of 20 g/L or more and 300 g/L or less in some embodiments, the density may be within a range of 40 g/L or more and 250 g/L or less, and the density may also be within a range of 60 g/L or more and 200 g/L or less in some embodiments. It is because the density equal to or more than the lower limit of this range facilitates improving the purification performance. It is because the density equal to or less than the upper limit of this range facilitates suppressing the pressure loss. Note that "the density of the outflow cell side catalyst layer" indicates a value obtained by dividing a mass of the outflow cell side catalyst layer by a volume of a part in the axial direction of the honeycomb substrate having the same axial direction length as the length in the extending direction of the outflow cell side catalyst layer. The density of the outflow cell side catalyst layer is smaller than the density of the inflow cell side catalyst layer in some embodiments. It is because the exhaust gas smoothly flows from the inflow cells to the outflow cells, thereby facilitating improving the purification performance and facilitating suppressing the pressure loss.

A thickness of the outflow cell side catalyst layer is not specifically limited, and a common thickness can be used. For example, the thickness is within a range of 1% or more and 100% or less of the thickness of the partition wall in some embodiments, and the thickness may be within a range of 1% or more and 20% or less in some embodiments. It is because the thickness equal to or more than the lower limit of this range facilitates suppressing the excessively increased speed of the exhaust gas passing through the outflow side partition wall portion, in addition to ensuring a contact frequency of the exhaust gas and the catalyst when the exhaust gas passes the outflow side partition wall portion. It is because the thickness equal to less than the upper limit of this range facilitates suppressing the excessively decreased speed of the exhaust gas passing through the outflow side partition wall portion.

While the outflow cell side catalyst layer is not specifically limited as long as it includes the catalytic metal, it usually includes the catalyst metal particles and the carrier that supports the catalyst metal particles. The outflow cell side catalyst layer is, for example, configured such that the carrier with catalyst that supports the catalyst metal particles is arranged within the pore in the inner region of the partition wall.

A material of the catalytic metal is similar to that of the catalytic metal included in the inflow cell side catalyst layer except that rhodium (Rh) and the like is used in some embodiments, and therefore, the description is omitted here. An average grain diameter of the catalyst metal particles is similar to that of the catalyst metal particles included in the inflow cell side catalyst layer, and therefore, the description is omitted here.

A content of the catalytic metal per 1 L of volume of the substrate is not specifically limited, and a common content can be used. The content differs depending on the material of the catalytic metal, and the content is within a range of 0.01 g or more and 2 g or less in some embodiments when the material is Rh, Pd, or Pt. It is because the content equal to or more than the lower limit of this range ensures obtaining the sufficient catalytic action, and the content equal to less than the upper limit of this range yields an advantage in cost simultaneously with ensuring a suppressed grain growth of the catalytic metal. Here, the content of the catalytic metal per 1 L of volume of the substrate means a value obtained by dividing the mass of the catalytic metal contained in the outflow cell side catalyst layer by a volume of a part in the axial direction of the honeycomb substrate having the same axial direction length as the length in the extending direction of the outflow cell side catalyst layer.

A material and a shape of the carrier is similar to those of the carrier included in the inflow cell side catalyst layer, and therefore, the description is omitted here.

An average grain diameter of the carrier in powder form is not specifically limited. For example, the average grain diameter is within a range of 0.01 μm or more and 5 μm or less, and the average grain diameter may be within a range of 0.1 μm or more and 1 μm or less in some embodiments. It is because the average grain diameter equal to or more than the lower limit of this range facilitates suppressing the excessively decreased speed of the exhaust gas passing through the outflow side partition wall portion, in addition to ensuring obtaining a sufficient heat resistant property. It is because the average grain diameter equal to less than the upper limit of this range facilitates suppressing the excessively increased speed of the exhaust gas passing through the outflow side partition wall portion, in addition to ensuring that the slurry penetrates in the inner region of the partition wall when the slurry containing the carrier in powder form is supplied to the inner region of the partition wall in order to form the outflow cell side catalyst layer.

A mass ratio of the catalyst metal particles to the total mass of the catalyst metal particles and the carrier is similar to the mass ratio of the catalyst metal particles in the inflow cell side catalyst layer, and therefore, the description is omitted here. A method to cause the carrier to support the catalyst metal particles is similar to the method to cause the carrier to support the catalyst metal particles in the inflow cell side catalyst layer, and therefore, the description is omitted here. The outflow cell side catalyst layer may include the cocatalyst that does not support the catalyst metal particles besides the catalyst metal particles and the carrier. A material, a shape, and a mass ratio of the cocatalyst are similar to those in the cocatalyst included in the inflow cell side catalyst layer, and therefore, the description is omitted here. An average grain diameter of the cocatalyst in powder form is similar to the average grain diameter of the carrier in powder form, and therefore, the description is omitted here.

While a forming method for the outflow cell side catalyst layer is not specifically limited, and a common method can be used, examples of the method include, for example, a method that dries and fires a slurry after supplying the slurry to the inner region on the outflow cell side in the outflow side region of the partition wall.

While the slurry is not specifically limited as long as the catalytic metal is contained besides the solvent, it usually contains the catalyst metal particles and the carrier. A solvent is similar to that for the slurry used in forming the inflow cell side catalyst layer, and therefore, the description is omitted here. The slurry may further contain any ingredients as necessary, such as a cocatalyst, an oxygen absorption/emission material, a binder, and an additive.

The properties and the like, such as the average grain diameters of the carrier and the cocatalyst in powder form contained in the slurry, and a solid content concentration, viscosity, and the like of the slurry can be appropriately adjusted such that the slurry penetrates in the inner region of the partition wall and the gas permeability coefficient Kb of the outflow side partition wall portion falls within the desired range.

While a method for supplying the slurry to the inner region of the outflow cell side in the outflow side region of the partition wall is not specifically limited, and a common method can be used, examples of the method include, for example, a method where a honeycomb substrate is immersed in the slurry from the outflow side end surface side, and after a predetermined period elapses, the honeycomb substrate is taken out of the slurry.

A drying condition and a firing condition in the method that dries and fires the slurry after supplying the slurry to the inner region on the outflow cell side in the outflow side region of the partition wall are similar to the drying condition and the firing condition in the forming method for the inflow cell side catalyst layer, and therefore, the description is omitted here.

Note that the properties and the like, such as a density, a thickness, and porosity, of the outflow cell side catalyst layer can be prepared by a supply amount of the slurry, a shape, an average grain diameter, and a content of each ingredient, such as the catalyst metal particles, the carrier, and the cocatalyst, contained in the slurry, properties of the slurry, a drying condition, a firing condition, and the like.

4. Honeycomb Substrate

The honeycomb substrate has porous partition walls that define a plurality of cells extending from the inflow side end surface to the outflow side end surface. The plurality of cells include the inflow cells and the outflow cells adjacent to one another and between which the partition wall is interposed. The inflow cell has the open inflow side end and the sealed outflow side end, and the outflow cell has the inflow side end sealed and the outflow side end opened. The honeycomb substrate is what is called a wall-flow type honeycomb substrate.

The honeycomb substrate is a substrate in which a framing portion and the partition walls separating the space inside the frame portion in a honeycomb shape are integrally formed.

The length in the axial direction of the honeycomb substrate is not specifically limited, and a common length can be used. For example, the length is within a range of 10 mm or more and 500 mm or less in some embodiments, and the length may be within a range of 50 mm or more and 300 mm or less in some embodiments. A capacity of the honeycomb substrate, that is, a total volume of the cells, is not specifically limited, and a common capacity can be used. For example, the capacity is within a range of 0.1 L or more and 5 L or less in some embodiments.

While a material of the honeycomb substrate is not specifically limited, and a common material can be used, examples of the material include, for example, ceramics, such as cordierite, silicon carbide (SiC), and aluminum titanate, alloy, such as stainless steel, and the like.

While a shape of the framing portion is not specifically limited, and a common shape can be used, examples of the shape include, for example, a tubular shape, such as an ellipse tubular shape and a polygonal tubular shape besides a cylindrical shape. Other configurations of the framing portion are not specifically limited, and common configurations can be used.

A shape of the partition wall is not specifically limited, and a common shape can be used. While the whole length in the extending direction of the partition wall is not specifically limited, it is usually approximately the same as the axial direction length of the honeycomb substrate. A thickness of the partition wall is not specifically limited, and a common thickness can be used. For example, the thickness is within a range of 50 μm or more and 2000 μm or less in some embodiments, and the thickness may be within a range of 100 μm or more and 1000 μm or less in some embodiments. It is because the thickness of the partition wall within these ranges ensures obtaining a sufficient PM trap performance and sufficiently suppressing the pressure loss while securing a strength of the substrate.

The partition wall has a porous structure through which the exhaust gas can pass. A porosity of the partition wall is not specifically limited, and a common porosity can be used. For example, the porosity is within a range of 40% or more and 70% or less in some embodiments, and the porosity may be within a range of 50% or more and 70% or less in some embodiments. It is because the porosity equal to or more than the lower limit of these ranges ensures effectively suppressing the pressure loss, and the porosity equal to less than the upper limit of these ranges ensures securing a sufficient mechanical strength. An average pore diameter of the pores of the partition wall is not specifically limited, and a common average pore diameter can be used. For example, the average pore diameter is within a range of 1 μm or more and 60 μm or less in some embodiments, and the average pore diameter may be within a range of 5 μm or more and 30 μM or less in some embodiments. It is because the average pore diameter of the pores within these ranges ensures obtaining a sufficient PM trap performance and sufficiently suppressing the pressure loss. Note that "the average pore diameter of the pores of the partition wall" indicates, for example, a measurement by a bubble point method using a perm porometer.

The inflow cells and the outflow cells are formed by the partition walls separating the space inside the framing portion, and are adjacent to one another with the partition walls interposed therebetween. The inflow cells and the outflow cells usually have a direction perpendicular to the extending direction surrounded by the partition walls.

The inflow cell usually has the outflow side end sealed by a sealing portion. The outflow cell usually has the inflow side end sealed by a sealing portion. A length in the extending direction of the sealing portion is not specifically limited, and it may be a common length. For example, the length is within a range of 2 mm or more and 20 mm or less in some embodiments. A material of the sealing portion is not specifically limited, and it may be a common material.

A cross-sectional shape perpendicular to the extending direction of the inflow cell and the outflow cell is not specifically limited, and a common shape can be used, and can be appropriately set considering a flow rate, elements, and the like of the exhaust gas that passes through the exhaust gas purification device. Examples of the cross-sectional shape include, for example, a rectangular shape, such as a square shape, a polygonal shape including a hexagonal shape and the like, and a circular shape. A cross-sectional area perpendicular to the extending direction of the inflow cell and the outflow cell is not specifically limited, and a common cross-sectional area can be used. For example, the cross-sectional area is within a range of 1 mm$^2$ or more and 7 mm$^2$ or less. A length in the extending direction of the inflow cell and the outflow cell is not specifically limited. The length is usually approximately the same as a length obtained by subtracting a length in the extending direction of the sealing portion from the axial direction length of the honeycomb substrate. Examples of an arrangement aspect of the inflow cell and the outflow cell include, for example an aspect like a checkered pattern where the inflow cells and the outflow cells are alternately arranged as in the arrangement aspects in the first example and the second example.

5. Exhaust Gas Purification Device

The exhaust gas purification device of the first embodiment includes the honeycomb substrate, the inflow cell side catalyst layer, and the outflow cell side catalyst layer. The exhaust gas purification device usually further includes the sealing portions that seals the outflow side end of the inflow cell and the inflow side end of the outflow cell. The exhaust gas purification device of the embodiment can further improve the purification performance by further including the outflow cell side catalyst layer, compared with the second embodiment.

The exhaust gas purification device is not specifically limited as long as it includes the honeycomb substrate, the inflow cell side catalyst layer, and the outflow cell side catalyst layer. The inflow cell side catalyst layer includes the catalytic metal that contains at least one of platinum (Pt) and palladium (Pd), and the outflow cell side catalyst layer includes the catalytic metal that contains rhodium (Rh) in some embodiments. It is because since at least one of Pt and Pd contained in the inflow cell side catalyst layer can efficiently oxidize hydrocarbon (HC) in the exhaust gas with rich atmosphere, the outflow cell side catalyst layer can be suppressed from being poisoned by the HC with Ce as a starting point. It is because since, in addition to the fact that when the HC is oxidized by at least one of Pt and Pd, a heat generation is larger and a generation amount of $H_2O$ is larger than the case of oxidizing with Rh, Rh has steam reforming activity higher than those of Pt and Pd, the HC can be efficiently reformed with the outflow cell side catalyst layer. As the exhaust gas purification device, among all, the inflow cell side catalyst layer that includes the catalytic metal containing Pt may be used in some embodiments. It is because the purification performance can be further effectively improved.

II. Second Embodiment

An exhaust gas purification device of the second embodiment does not include the catalyst layer in the inner region on the outflow cell side in the outflow side region of the partition wall, but the outflow side partition wall portion includes the outflow side region of the partition wall.

First, an outline of the exhaust gas purification device of the second embodiment is exemplarily described.

Figure 3:
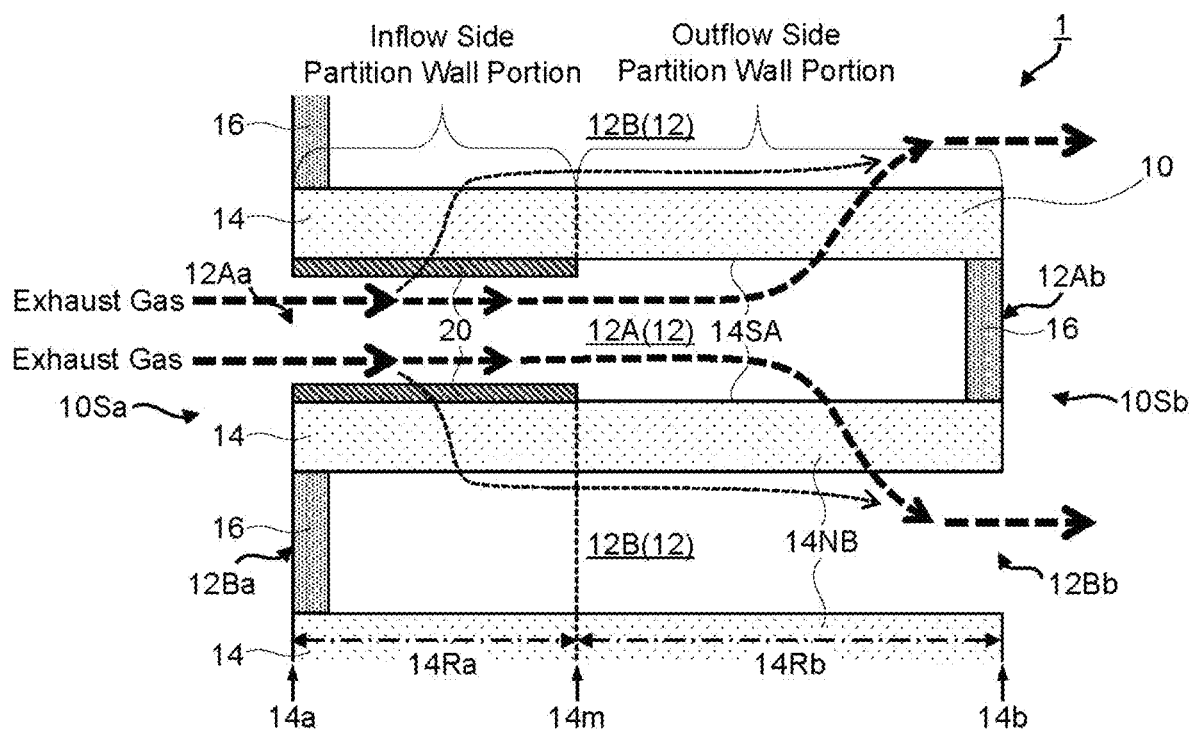
FIG. 3 is a cross-sectional view schematically illustrating a main part of a cross-sectional surface parallel to the extending direction of a cell in an exhaust gas purification device of a second example according to the embodiment.

Here, FIG. 3 is a cross-sectional view schematically illustrating a main part of a cross-sectional surface parallel to the extending direction of the cells in the exhaust gas purification device in the second example according to the embodiment. Note that the exhaust gas purification device in the second example is schematically illustrated in the perspective view in FIG. 1 similarly to the first example.

As illustrated in FIG. 1 and FIG. 3, the exhaust gas purification device 1 of the second example includes the honeycomb substrate 10, the sealing portions 16, and the inflow cell side catalyst layers 20. The configurations of the honeycomb substrate 10 and the sealing portion 16 are similar to the first example.

The inflow cell side catalyst layer 20 is disposed on the surface 14SA on the inflow cell side in the inflow side region 14Ra from the inflow side end 14a to the predetermined position 14m on the outflow side of the partition wall 14. The inflow cell side catalyst layer 20 includes catalyst metal particles (not illustrated) having platinum (Pt) and a carrier (not illustrated) that supports them. The inflow cell side catalyst layer 20 has a content of the catalytic metal and the like adjusted so as to obtain a necessary purification performance, and has its properties and the like, such as a density, a thickness, average grain diameters of the carrier and the cocatalyst, and porosity adjusted such that the ratio Ka/Kb of the gas permeability coefficients described later falls within the range of 0.4 or more and 0.8 or less. Catalyst layer is absent in the inner region 14NB on the outflow cell side in the outflow side region 14Rb from the predetermined position 14m to the outflow side end 14b of the partition wall 14.

When the gas permeability coefficient of the inflow side partition wall portion including the inflow side region 14Ra of the partition wall 14 and the inflow cell side catalyst layer 20 is Ka and the gas permeability coefficient of the outflow side partition wall portion including only the outflow side region 14Rb of the partition wall 14 is Kb, the ratio Ka/Kb of the gas permeability coefficients is within the range of 0.4 or more and 0.8 or less.

When the ratio Ka/Kb of the gas permeability coefficients is decreased to lower than 0.4 by decreasing the gas permeability coefficient Ka by increasing the density of the inflow cell side catalyst layer 20 in order to improve the purification performance, the speed of the exhaust gas, which has flowed in from the inflow side end 14a to the inflow cell 12A, passing through the inflow side partition wall portion is excessively decreased and the speed of the exhaust gas flowing along the inflow cell side catalyst layer 20 is excessively increased. This causes a difficulty in bringing the exhaust gas into contact with the inflow cell side catalyst layer 20 such that the exhaust gas is efficiently purified, and the pressure loss is increased. Meanwhile, when the ratio Ka/Kb of the gas permeability coefficients is increased to more than 0.8 by increasing the gas permeability coefficient Ka by decreasing the density of the inflow cell side catalyst layer 20, the speed of the exhaust gas, which has flowed in from the inflow side end 14a to the inflow cell 12A, passing through the inflow side partition wall portion is excessively increased, and the speed of the exhaust gas flowing along the inflow cell side catalyst layer 20 is excessively decreased. This again causes a difficulty in bringing the exhaust gas into contact with the inflow cell side catalyst layer 20 such that the exhaust gas is efficiently purified.

In contrast to this, in the exhaust gas purification device 1 in the second example, making the ratio Ka/Kb of the gas permeability coefficients fall within the range of 0.4 or more and 0.8 or less adjusts the speed of the exhaust gas, which has flowed in from the inflow side end 14a to the inflow cell 12A, passing through the inflow side partition wall portion and the speed of the exhaust gas flowing along the inflow cell side catalyst layer 20 within desired ranges, thereby ensuring bringing the exhaust gas into contact with the inflow cell side catalyst layer 20 such that the exhaust gas is efficiently purified and suppressing the pressure loss.

Therefore, in the exhaust gas purification device in the second embodiment, making the ratio Ka/Kb of the gas permeability coefficients fall within the range of 0.4 or more and 0.8 or less as in the second example adjusts the flow of the exhaust gas in the exhaust gas purification device, thereby ensuring the improved purification performance and the suppressed pressure loss.

Subsequently, each configuration of the exhaust gas purification device of the second embodiment is described in detail.

1. Ratio Ka/Kb of Gas Permeability Coefficients

When the gas permeability coefficient of the inflow side partition wall portion including the inflow side region of the partition wall and the inflow cell side catalyst layer is Ka and the gas permeability coefficient of the outflow side partition wall portion including the outflow side region of the partition wall is Kb, the ratio Ka/Kb of the gas permeability coefficients is within the range of 0.4 or more and 0.8 or less.

Here, the definition of "the gas permeability coefficient" and the measuring method of the gas permeability coefficient are similar to those in the first embodiment, and therefore, the description is omitted here.

The gas permeability coefficient Ka indicates a similar one to that in the first embodiment. The gas permeability coefficient Kb indicates one that is obtained from the gas flow rate and the differential pressure between the inflow side and the outflow side of the outflow side partition wall portion when the gas is passed through the outflow side region of the partition wall included in the outflow side partition wall portion.

The ratio Ka/Kb of the gas permeability coefficients is similar to the first embodiment, and therefore, the description is omitted here.

The gas permeability coefficient Ka is not specifically limited. For example, the gas permeability coefficient Ka has a range similar to that of the gas permeability coefficient Ka in the first embodiment in some embodiments. It is because of the similar reason to the first embodiment. An adjustment method of the gas permeability coefficient Ka is similar to that in the first embodiment, and therefore, the description is omitted here.

The gas permeability coefficient Kb is not specifically limited. For example, the gas permeability coefficient Kb has a range similar to that of the gas permeability coefficient Kb in the first embodiment in some embodiments. It is because of the similar reason to the first embodiment.

A length in the extending direction of the inflow side partition wall portion is similar to that in the first embodiment, the description is omitted here. A length in the extending direction of the outflow side partition wall portion is similar to that in the first embodiment, the description is omitted here.

2. Inflow Cell Side Catalyst Layer

The inflow cell side catalyst layer is disposed on the surface on the inflow cell side in the inflow side region from the inflow side end of the partition wall to the predetermined position on the outflow side of the partition wall. This causes the inflow cell side catalyst layer to obstruct the pores opposed to the inflow cells in the inflow side region of the partition wall, and the gas permeability coefficient of the inflow side partition wall portion that includes inflow side region of the partition wall and the inflow cell side catalyst layer to be decreased to lower than that of the outflow side partition wall portion including the outflow side region of the partition wall.

Here, the definitions of "the predetermined position on the outflow side of the partition wall" and "disposed on the surface on the inflow cell side in the inflow side region from the inflow side end to the predetermined position on the outflow side of the partition wall" are similar to those in the first embodiment, and therefore, the descriptions are omitted here.

A density of the inflow cell side catalyst layer is not specifically limited, and a common density can be used. For example, the density has a range similar to the density of the inflow cell side catalyst layer in the first embodiment in some embodiments. It is because of the similar reason to the first embodiment.

A thickness of the inflow cell side catalyst layer is not specifically limited, and a common thickness can be used. For example, the thickness has a range similar to the thickness of the inflow cell side catalyst layer in the first embodiment in some embodiments. It is because of the similar reason to the first embodiment.

While the inflow cell side catalyst layer is not specifically limited as long as it includes the catalytic metal, it usually includes the catalyst metal particles and the carrier that supports the catalyst metal particles. The inflow cell side catalyst layer is, for example, a porous sintered body of the carrier with catalyst that supports the catalyst metal particles.

A material of the catalytic metal and an average grain diameter of the catalyst metal particles are similar to those in the first embodiment, and therefore, the description is omitted here. A content of the catalytic metal per 1 L of volume of the substrate is similar to that in the first embodiment, and therefore, the description is omitted here.

A material and a shape of the carrier are similar to those in the first embodiment, and therefore, the description is omitted here. An average grain diameter of the carrier in powder form is similar to that in the first embodiment, and therefore, the description is omitted here.

A mass ratio of the catalyst metal particles to the total mass of the catalyst metal particles and the carrier and a method to cause the carrier to support the catalyst metal particles are similar to those in the first embodiment, and therefore, the description is omitted here.

The inflow cell side catalyst layer may include a cocatalyst that does not support the catalyst metal particles besides the catalyst metal particles and the carrier. The cocatalyst is similar to that in the first embodiment, and therefore, the description is omitted here.

A forming method of the inflow cell side catalyst layer and a slurry are similar to those in the first embodiment, and therefore, the description is omitted here. Note that an adjustment method for properties and the like, such as a density, a thickness, and porosity, of the inflow cell side catalyst layer are similar to those in the first embodiment, and therefore, the description is omitted here.

3. Other

The exhaust gas purification device of the second embodiment includes the honeycomb substrate and the inflow cell side catalyst layer. The honeycomb substrate is similar to that in the first embodiment, and therefore, the description is omitted here. The exhaust gas purification device usually further includes the sealing portions that seal the outflow side ends of the inflow cells and the inflow side ends of the outflow cells.

EXAMPLES

The following further specifically describes the exhaust gas purification device of the embodiment with Example, Comparative Example, and Reference Example.

1. Change in 20% NOx Conversion Temperature Relative to Pressure Loss

Respective exhaust gas purification devices were manufactured for Example, Comparative Example 1, and Comparative Example 2, and changes in 20% NOx conversion temperature relative to the pressure loss were evaluated for those exhaust gas purification devices. Here, FIG. 4A to FIG. 4C are cross-sectional views schematically illustrating respective main parts of cross-sectional surfaces parallel to the extending direction of the cells in the exhaust gas purification devices manufactured in Example, Comparative Example 1, and Comparative Example 2.

Example

Figure 4A:
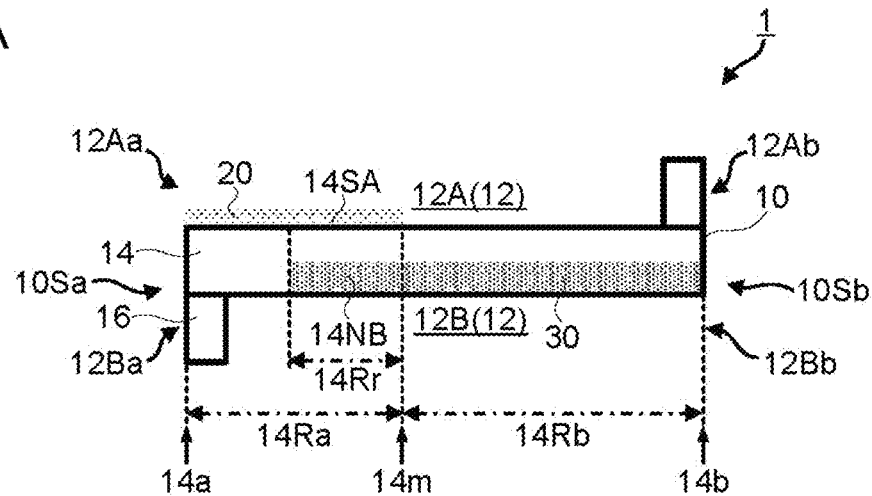
FIGS. 4A to 4C are cross-sectional views schematically illustrating respective main parts of cross-sectional surfaces parallel to the extending directions of cells in exhaust gas purification devices prepared in Example, Comparative Example 1, and Comparative Example 2.
Figure 4B:
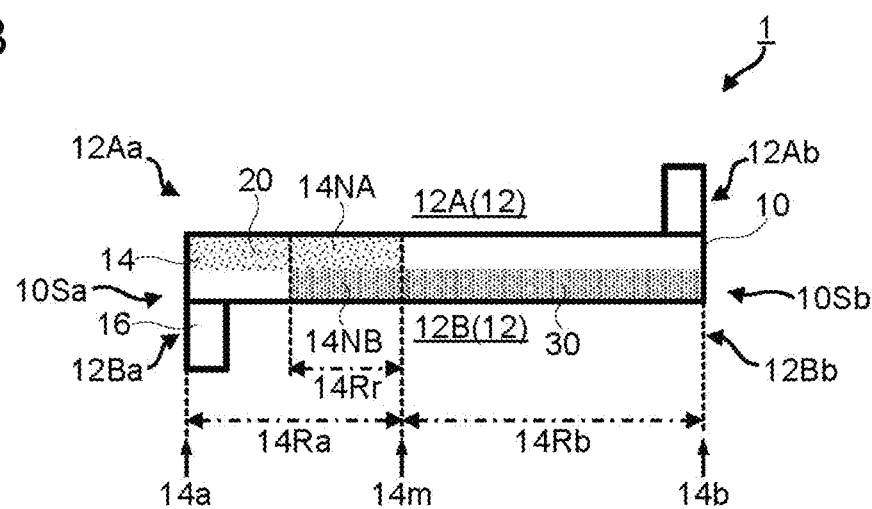
Figure 4C:
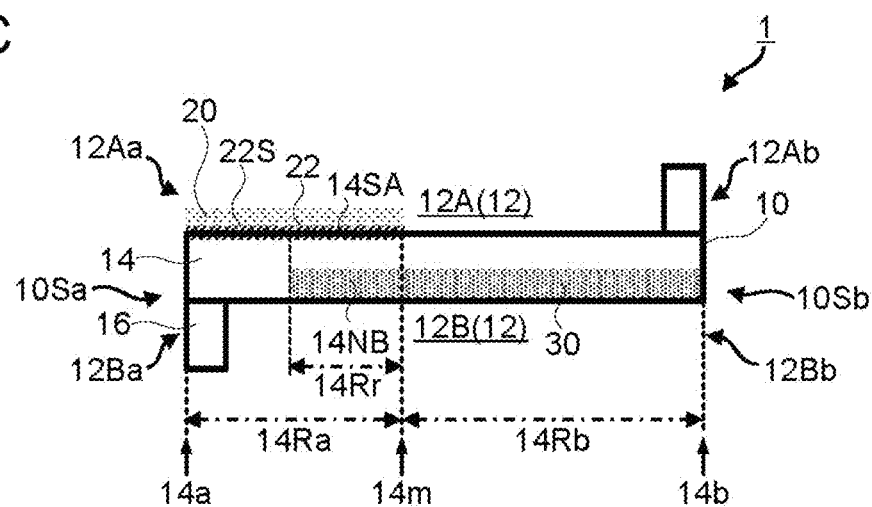

The exhaust gas purification device 1 illustrated in FIG. 4A was manufactured. In the exhaust gas purification device 1, the inflow cell side catalyst layer 20 is disposed on the surface 14SA on the inflow cell side in the inflow side region 14Ra from the inflow side end 14a to the predetermined position 14m on the outflow side of the partition wall 14. The outflow cell side catalyst layer 30 is disposed in the inner region 14NB on the outflow cell side in the outflow side region 14Rb from the predetermined position 14m to the outflow side end 14b of the partition wall 14 and the overlapping region 14Rr that extends to the inflow side from the predetermined position 14m and overlaps the inflow side region 14Ra.

The length in the extending direction of the inflow side region 14Ra of the partition wall 14 is 40% of the length in the extending direction of the partition wall 14. The length in the extending direction of the outflow side region 14Rb in the partition wall 14 is 60% of the length in the extending direction of the partition wall 14. The length in the extending direction of the overlapping region 14Rr of the partition wall 14 is 20% of the length in the extending direction of the partition wall 14.

The inflow cell side catalyst layer 20 includes catalyst metal particles having Pd and carrier in powder form having alumina that supports the catalyst metal particles and an OSC material. The density of the inflow cell side catalyst layer 20 is 49 g/L, the thickness of the inflow cell side catalyst layer 20 is 10% of the partition wall, and the content of Pd is 0.6 g/L. The outflow cell side catalyst layer 30 includes catalyst metal particles having Rh and carrier in powder form having alumina that supports the catalyst metal particles and an OSC material. The density of the outflow cell side catalyst layer 30 is 100 g/L and the content of Rh is 0.3 g/L.

During the fabrication of the exhaust gas purification device 1, first, a GPF without catalyst coating was prepared. The GPF included the honeycomb substrate 10 made of cordierite and the sealing portions 16. The honeycomb substrate 10 is integrally formed by a cylindrically-shaped framing portion (not illustrated) and the partition walls 14 that divide the space inside the framing portion in honeycomb shape. The partition walls 14 are porous bodies that define the plurality of cells 12 extending from the inflow side end surface 10Sa of the honeycomb substrate 10 to the outflow side end surface 10Sb. The plurality of cells 12 include the inflow cells 12A and the outflow cells 12B adjacent to one another with the partition walls 14 interposed therebetween. The inflow cell 12A has the open inflow side end 12Aa and the outflow side end 12Ab sealed by the sealing portion 16, and the outflow cell 12B has the inflow side end 12Ba sealed by the sealing portion 16 and the open outflow side end 12Bb. A size and a structure of the honeycomb substrate 10 of the GPF and a length in the extending direction of the sealing portion 16 are as follows.

(Configuration of Honeycomb Substrate and Sealing Portion of GPF)

Size of Honeycomb Substrate: Outer Diameter×Length in Axial Direction=117 mm×122 mm Thickness of Partition Wall: 200 μm Cell Density: 300 per square inch Length in Extending Direction of Sealing Portion: 4 mm Next, a slurry for inflow cell side catalyst layer was prepared by mixing carrier with catalyst in which carrier in powder form supported catalyst metal particles having Pd and a solvent. Next, the slurry for inflow cell side catalyst layer was dried and fired after supplying the slurry for inflow cell side catalyst layer to the surface 14SA on the inflow cell side in the inflow side region 14Ra of the partition wall 14. This formed the inflow cell side catalyst layer 20.

Next, a slurry for outflow cell side catalyst layer was prepared by mixing carrier with catalyst in which carrier in powder form supported catalyst metal particles having Rh and a solvent. Next, the slurry for outflow cell side catalyst layer was dried and fired after supplying the slurry for outflow cell side catalyst layer to the inner region 14NB on the outflow cell side in the outflow side region 14Rb and the overlapping region 14Rr of the partition wall 14. This formed the outflow cell side catalyst layer 30. Thus, the exhaust gas purification device 1 was prepared.

Comparative Example 1

The exhaust gas purification device 1 illustrated in FIG. 4B was prepared. In the exhaust gas purification device 1, the inflow cell side catalyst layer 20 is disposed in an inner region 14NA on the inflow cell side in the inflow side region 14Ra of the partition wall 14. In this respect, the exhaust gas purification device 1 is as the same as Example except for an average grain diameter of the carrier in powder form included in the inflow cell side catalyst layer 20 and a thickness of the inflow cell side catalyst layer 20.

A fabrication method of the exhaust gas purification device 1 is as the same as Example except that the inflow cell side catalyst layer 20 is formed by drying and firing the slurry for inflow cell side catalyst layer after supplying the slurry for inflow cell side catalyst layer to the inner region 14NA on the inflow cell side in the inflow side region 14Ra of the partition wall 14.

Comparative Example 2

The exhaust gas purification device 1 illustrated in FIG. 4C was prepared. In the exhaust gas purification device 1, a preprocessing layer 22 is disposed so as to obstruct the pores of the partition wall on the surface 14SA on the inflow cell 12A side in the inflow side region 14Ra of the partition wall 14. The inflow cell side catalyst layer 20 is disposed on a surface 22S of the preprocessing layer 22. The exhaust gas purification device 1 is as the same as Example except for those points.

In a fabrication method of the exhaust gas purification device 1, the preprocessing layer 22 was formed by thinly applying a slurry for preprocessing that was mixed with alumina ($Al_2O_3$) and a solvent and did not include a catalytic metal on the surface 14SA in the inflow cell 12A side in the inflow side region 14Ra of the partition wall 14 before forming the inflow cell side catalyst layer 20. Subsequently, the inflow cell side catalyst layer 20 was formed by drying and firing the slurry for outflow cell side catalyst layer after supplying the slurry for outflow cell side catalyst layer to the surface 22S of the preprocessing layer 22. The fabrication method of the exhaust gas purification device 1 is the same as Example except for those points.

[Evaluation]

After performing a durability test, the exhaust gas purification devices of Example, Comparative Example 1, and Comparative Example 2 had their 20% NOx conversion temperatures measured and pressure losses measured.

<Durability Test>

The durability test was performed by installing the exhaust gas purification devices in an exhaust system of a gasoline engine bench, and exhaust gases with rich, stoichiometric, and lean atmospheres were alternately flowed for respective certain periods of time in repeated manner over fifty hours at a catalyst bed temperature of 950° C.

<Measurement of 20% NOx Conversion Temperature>

While an exhaust gas in an atmosphere having an air-fuel ratio (A/F) of 14.4 was flowed at a flow rate of 35 g/sec to the exhaust gas purification devices installed in the exhaust system of the gasoline engine bench, an entrance gas temperature was gradually increased from 200° C. to 600° C. using a heat exchanger installed in an upper stream of the exhaust gas purification device. The NOx concentrations of the entrance gas and the output gas were measured at each entrance gas temperature to calculate NOx conversion rates, and the temperature of the entrance gas at the time point in which 20% of the NOx was converted was measured as a 20% NOx conversion temperature.

<Measurement of Pressure Loss>

A pressure difference between the entrance gas and the output gas when the exhaust gas was flowed at a flow rate of 35 g/sec to the exhaust gas purification device installed in the exhaust system as described above was measured as a pressure loss.

Figure 5:
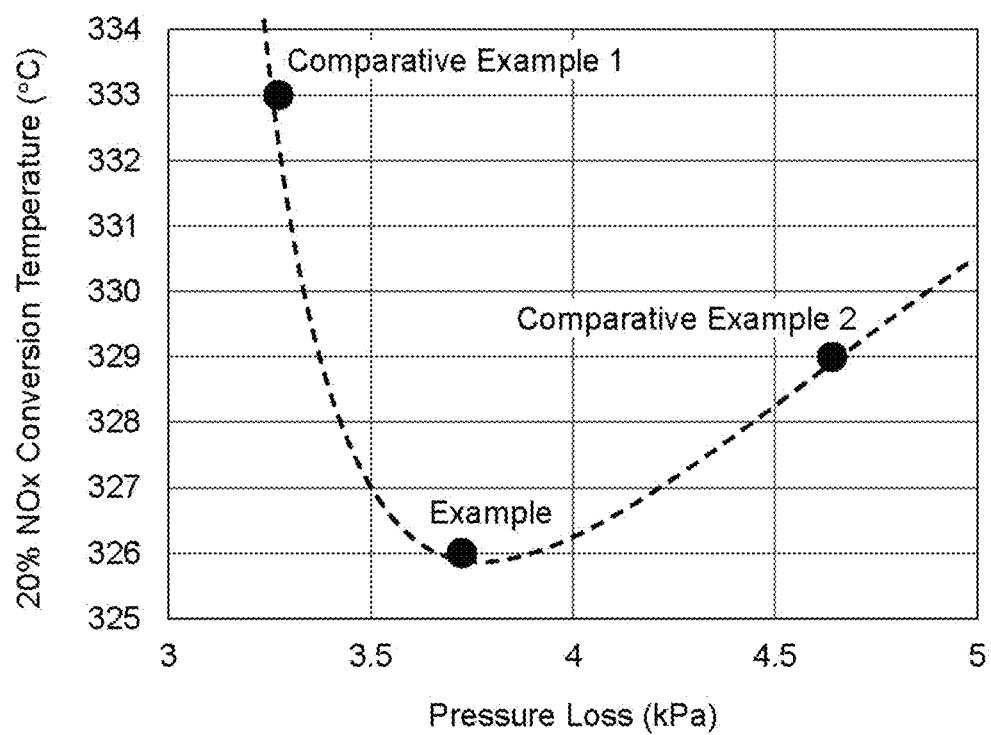
FIG. 5 is a graph illustrating changes in 20% NOx conversion temperature relative to pressure losses in the exhaust gas purification devices of Example, Comparative Example 1, and Comparative Example 2.

The measurement results of the 20% NOx conversion temperature and the pressure loss are shown in the following Table 1. FIG. 5 is a graph illustrating changes in the 20% NOx conversion temperature relative to the pressure loss in the exhaust gas purification devices in Example, Comparative Example 1, and Comparative Example 2. As illustrated in Table 1 and FIG. 5, compared with Comparative Example 1, the 20% NOx conversion temperature was decreased in Example. This is considered that the fact that the inflow cell side catalyst layer 20 is disposed on the surface 14SA on the inflow cell side in the inflow side region 14Ra of the partition wall 14 in Example compared with the inflow cell side catalyst layer 20 disposed in the inner region 14NA on the inflow cell side in the inflow side region 14Ra of the partition wall 14 in Comparative Example 1 decreased the speed of the exhaust gas passing through the inflow side partition wall portion, thereby ensuring bringing the exhaust gas into contact with the catalyst layer such that the exhaust gas is efficiently purified. Compared with Example, the 20% NOx conversion temperature was increased in Comparative Example 2 and the pressure loss was increased. This is considered that the fact that the preprocessing layer 22 is disposed so as to obstruct the pores of the partition wall on the surface 14SA on the inflow cell side in the inflow side region 14Ra of the partition wall 14 in Comparative Example 2 excessively decreased the speed of the exhaust gas passing through the inflow side partition wall portion, thereby failing to bring the exhaust gas into contact with the catalyst layer such that the exhaust gas is efficiently purified and failing to suppress the pressure loss.

TABLE 1

|  | Pressure Loss (kPa) | 20% NOx Conversion Temperature (° C.) |
| --- | --- | --- |
| Example | 3.72475 | 326 |
| Comparative Example 1 | 3.27095 | 333 |
| Comparative Example 2 | 4.6408 | 329 |

2. Change in Pressure Loss Relative to Ratio Ka/Kb of Gas Permeability Coefficients By using simulation software (axisuite (registered trademark) made by Exothermia S.A.) for exhaust gas purification device analysis, analytical models of the exhaust gas purification devices of Example, Comparative Example 1, and Comparative Example 2 were prepared, and changes in pressure loss relative to the ratio Ka/Kb of the gas permeability coefficients of the inflow side partition wall portion of the partition wall (the gas permeability coefficient: Ka) and the outflow side partition wall portion of the partition wall (the gas permeability coefficient: Kb) were obtained in the analytical models. Specifically, first, using the simulation software, the analytical model of the exhaust gas purification device of the following configuration was prepared.

(Configuration of Analytical Model)

Shape of Honeycomb Substrate: Cylindrical Shape

Figure 6:
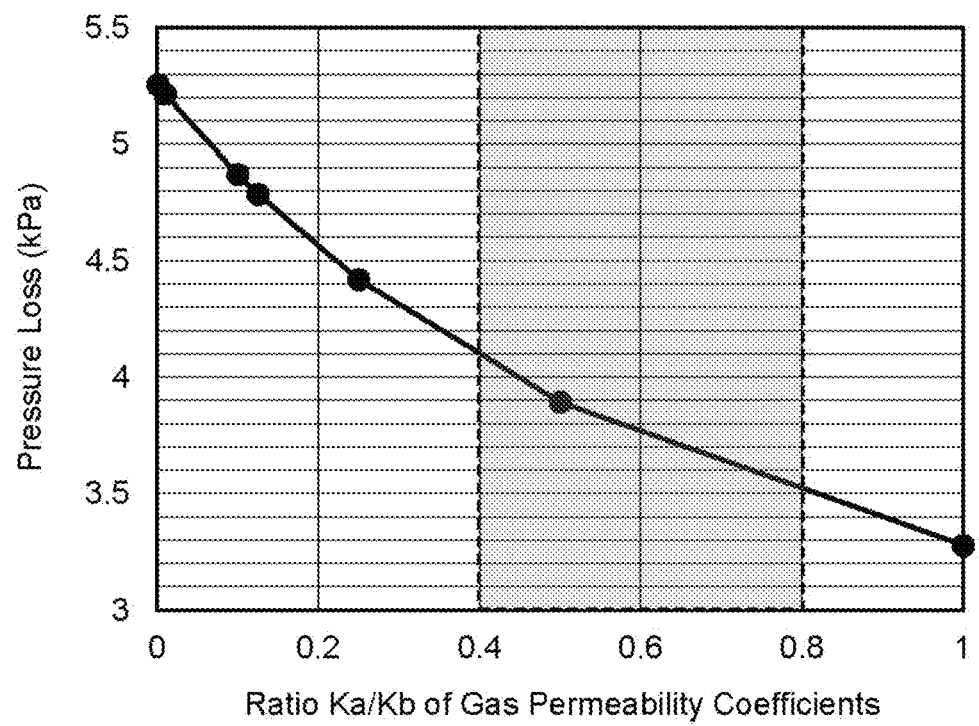
FIG. 6 is a graph illustrating a change in a calculation result of a pressure loss relative to a ratio Ka/Kb of gas permeability coefficients.

Size of Honeycomb Substrate: Outer Diameter×Length in Axial Direction=117 mm×122 mm Thickness of Partition Wall: 200 μm Cell Density: 300 per square inch Length in Extending Direction of Sealing Portion: 4 mm Length in Extending Direction of Inflow side Partition Wall Portion: 40% of Whole Length in Extending Direction of Partition Wall Length in Extending Direction of Outflow side Partition Wall Portion: 60% of Whole Length in Extending Direction of Partition Wall Subsequently, when the gas permeability coefficient Ka of the inflow side partition wall portion and the gas permeability coefficient Kb of the outflow side partition wall portion were set to the values of respective conditions illustrated in the following Table 2 by using the simulation software, pressure losses in the inflow side and the outflow side of the exhaust gas purification device were calculated in a simulation condition where an air was flowed in from the inflow side end surface of the exhaust gas purification device and flowed out to the outside from the outflow side end surface at a flow rate of 7 m$^3$/min at 25° C. The calculation results of the pressure loss are illustrated in the following table 2. FIG. 6 is a graph illustrating changes of calculation results of pressure loss relative to the ratio Ka/Kb of the gas permeability coefficients.

TABLE 2

| Conditions | Inflow Side Partition Wall Portion Gas Permeability Coefficient Ka (m$^2$) | Outflow Side Partition Wall Portion Gas Permeability Coefficient Kb (m$^2$) | Gas Permeability Coefficients Ratio Ka/Kb | Pressure Loss (kPa) |
| --- | --- | --- | --- | --- |
| 1 | 8.00E−14 | 8.00E−14 | 1 | 3.278 |
| 2 | 4.00E−14 | 8.00E−14 | 0.5 | 3.893 |
| 3 | 2.00E−14 | 8.00E−14 | 0.25 | 4.419 |
| 4 | 1.00E−14 | 8.00E−14 | 0.125 | 4.786 |
| 5 | 8.00E−15 | 8.00E−14 | 0.1 | 4.8695 |
| 6 | 8.00E−16 | 8.00E−14 | 0.01 | 5.2157 |
| 7 | 8.00E−17 | 8.00E−14 | 0.001 | 5.2544 |

Note that the values of the gas permeability coefficient Ka and the gas permeability coefficient Kb of the respective conditions illustrated in the Table 2 were identified from an actually measured value (3.278 kPa) of the pressure loss in a GPF having the following configuration under actual conditions (air flow rate of 7 m$^3$/min @ 25° C.) as the same as the simulation condition. In this respect, specifically, it was premised that the values of the gas permeability coefficient Ka and the gas permeability coefficient Kb in Condition 1 illustrated in the Table 2 were the same. In addition to it, the values of the gas permeability coefficient Ka and the gas permeability coefficient Kb in Condition 1 were set to values with which the actually measured value (3.278 kPa) of the pressure loss was calculated in the simulation condition (air flow rate 7 m³/min @ 25° C.) in the analytical model using the simulation software. In addition to it, the gas permeability coefficients Kb of Conditions 2 to 7 illustrated in the Table 2 were set to the same value as the gas permeability coefficient Kb in Condition 1, and the gas permeability coefficients Ka of Conditions 2 to 7 were set to the value obtained by decreasing the gas permeability coefficient Ka in Condition 1.

(Configuration of GPF)

Honeycomb Substrate: Honeycomb Substrate Made of Cordierite

Shape of Honeycomb Substrate: Cylindrical Shape

Size of Honeycomb Substrate: Outer Diameter×Length in Axial Direction=117 mm×122 mm Thickness of Partition Wall: 200 μm Cell Density: 300 per square inch Length in Extending Direction of Sealing Portion: 4 mm Length in Extending Direction of Inflow side Partition Wall Portion: 40% of Whole Length in Extending Direction of Partition Wall Length in Extending Direction of Outflow side Partition Wall Portion: 60% of Whole Length in Extending Direction of Partition Wall Catalyst Layer 1: Catalyst Layer Disposed in Inner Region on Inflow cell Side in Inflow side Region of Partition Wall Density of Catalyst Layer 1: 100 g/L Catalyst Layer 2: Catalyst Layer Disposed in Inner Region on Outflow cell Side in Outflow side Region of Partition Wall Density of Catalyst Layer 2: 100 g/L Here, the density of a catalyst layer 1 indicates a value obtained by dividing the mass of the catalyst layer 1 by a volume of a part in the axial direction of the honeycomb substrate having the axial direction length as the same as the length in the extending direction of the catalyst layer 1, and the density of a catalyst layer 2 indicates a value obtained by dividing the mass of the catalyst layer 2 by a volume of a part in the axial direction of the honeycomb substrate having the axial direction length as the same as the length in the extending direction of the catalyst layer 2.

As illustrated in Table 2 and FIG. 6 described above, when the ratio Ka/Kb of the gas permeability coefficients were decreased by decreasing the gas permeability coefficient Ka of the inflow side partition wall portion while maintaining the gas permeability coefficient Kb of the outflow side partition wall portion constant, the pressure loss increased as the ratio Ka/Kb of the gas permeability coefficients decreased.

[Overall Evaluation]

From the results of evaluations of changes in 20% NOx conversion temperature relative to the pressure loss and changes in the pressure loss relative to the ratio Ka/Kb of the gas permeability coefficients described above, it is considered that the pressure loss with which the 20% NOx conversion temperature becomes minimum in the exhaust gas purification device is approximately 3.7 kPa, and a range of the ratio Ka/Kb of the gas permeability coefficients where the pressure loss with which the 20% NOx conversion temperature decreases can be obtained is the range of 0.4 or more and 0.8 or less. Furthermore, it is considered that, when the ratio Ka/Kb of the gas permeability coefficients increases to more than the upper limit of this range, while the pressure loss decreases, the 20% NOx conversion temperature increases, and when the ratio Ka/Kb of the gas permeability coefficients decreases to lower than the lower limit of this range, the pressure loss increases and the 20% NOx conversion temperature increases.

Accordingly, in the exhaust gas purification device, it is considered that setting the ratio Ka/Kb of the gas permeability coefficients within the range of 0.4 or more and 0.8 or less ensures bringing the exhaust gas into contact with the inflow cell side catalyst layer 20 and the outflow cell side catalyst layer 30 such that the exhaust gas is efficiently purified and suppressing the pressure loss.

3. Reference: Arrangement of Catalytic Metal

In the exhaust gas purification device of the embodiment, the inflow cell side catalyst layer includes a catalytic metal containing at least one of palladium (Pd) and platinum (Pt) while the outflow cell side catalyst layer includes a catalytic metal containing rhodium (Rh) in some embodiments. The reason can be explained from a reference example disclosed in the reference document (R. Horn et al./Journal of Catalysis 249 (2007) 380-393). The following describes the reason from the reference example disclosed in the reference document.

Reference Example 1

In the reference document, when a mixed gas of methane ($CH_4$) and oxygen ($O_2$) are supplied to respective reactors in which a Pt-containing catalyst and a Rh-containing catalyst are arranged, changes in $O_2$ conversion ratios, $CH_4$ conversion ratios, and output gas temperatures, and $H_2$ selectivities, CO selectivities, $CO_2$ selectivities, and $H_2O$ selectivities of the respective catalysts relative to C/O ratio (ratio of the number of carbon atoms to the number of oxygen atoms) of the supply gas are measured. Note that outlines of the Pt-containing catalyst and the Rh-containing catalyst, and the supply gas in this case are as follows.

(Pt-Containing Catalyst)

Carrier made of $\alpha$-$Al_2O_3$ support 5±1% by mass of Pt.

Impregnating the carrier made of $\alpha$-$Al_2O_3$ with 5% by mass of Pt and subsequently firing the carrier in a mixed gas of hydrogen ($H_2$) and nitrogen ($N_2$) containing 10 volume % of $H_2$ at 500° C. for five hours fabricate it.

(Rh-Containing Catalyst)

Carrier made of $\alpha$-$Al_2O_3$ support 5±1% by mass of Rh.

Impregnating the carrier made of $\alpha$-$Al_2O_3$ with 5% by mass of Rh and subsequently firing the carrier in an atmosphere at 600° C. for six hours fabricate it.

(Supply Gas)

Composition: Mixed Gas of $CH_4$ and $O_2$ (C/O Ratio=0.6 to 2.6)

Flow Rate: 4.7 L/min

Pressure: 1 atm

Temperature: 400° C.

Figure 7:
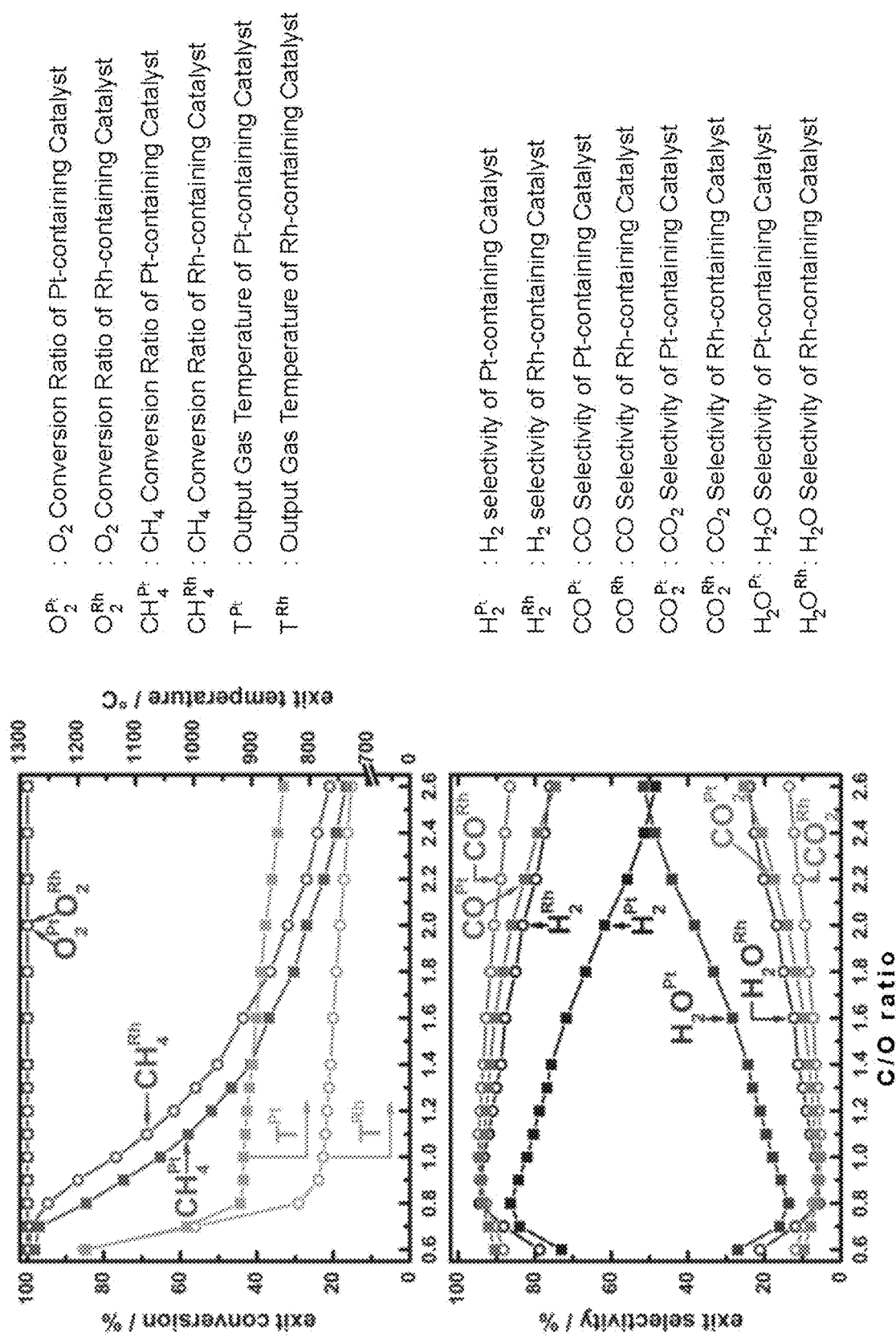
FIG. 7 is drawings corresponding to FIG. 2 of a reference document (R. Horn et al./Journal of Catalysis 249 (2007) 380-393) and is graphs upper portion of which illustrates changes in $O_2$ conversion ratios, $CH_4$ conversion ratios, and output gas temperatures of respective catalysts relative to a C/O ratio of a supply gas and lower portion of which illustrates changes in $H_2$ selectivities, CO selectivities, $CO_2$ selectivities, and $H_2O$ selectivities of the respective catalysts relative to the C/O ratio of the supply gas.

FIG. 7 is a drawing corresponding to FIG. 2 of the reference document, and the upper part is a graph illustrating changes in $O_2$ conversion ratios, $CH_4$ conversion ratios, and output gas temperatures, of the respective catalysts relative to the C/O ratio of the supply gas, and the lower part is a graph illustrating changes in $H_2$ selectivities, CO selectivities, $CO_2$ selectivities, and $H_2O$ selectivities of the respective catalysts relative to the C/O ratio of the supply gas.

Reference Example 2

In the reference document, when a mixed gas of methane ($CH_4$) and oxygen ($O_2$) are supplied to respective reactors in which the Pt-containing catalyst and the Rh-containing catalyst are arranged, flow rates of the respective elements and bed temperatures at each position in the flow direction of the supply gas of the reactor are measured. Note that the Pt-containing catalyst and the Rh-containing catalyst in this case are similar to the above, and outlines of the supply gas is as follows.

(Supply Gas)
Composition: Mixed Gas of $CH_4$ and $O_2$ (C/O Ratio=1.0 (Stoichiometric))
Flow Rate: 4.7 L/min
Pressure: 1 atm
Temperature: 400° C.

Figure 8:
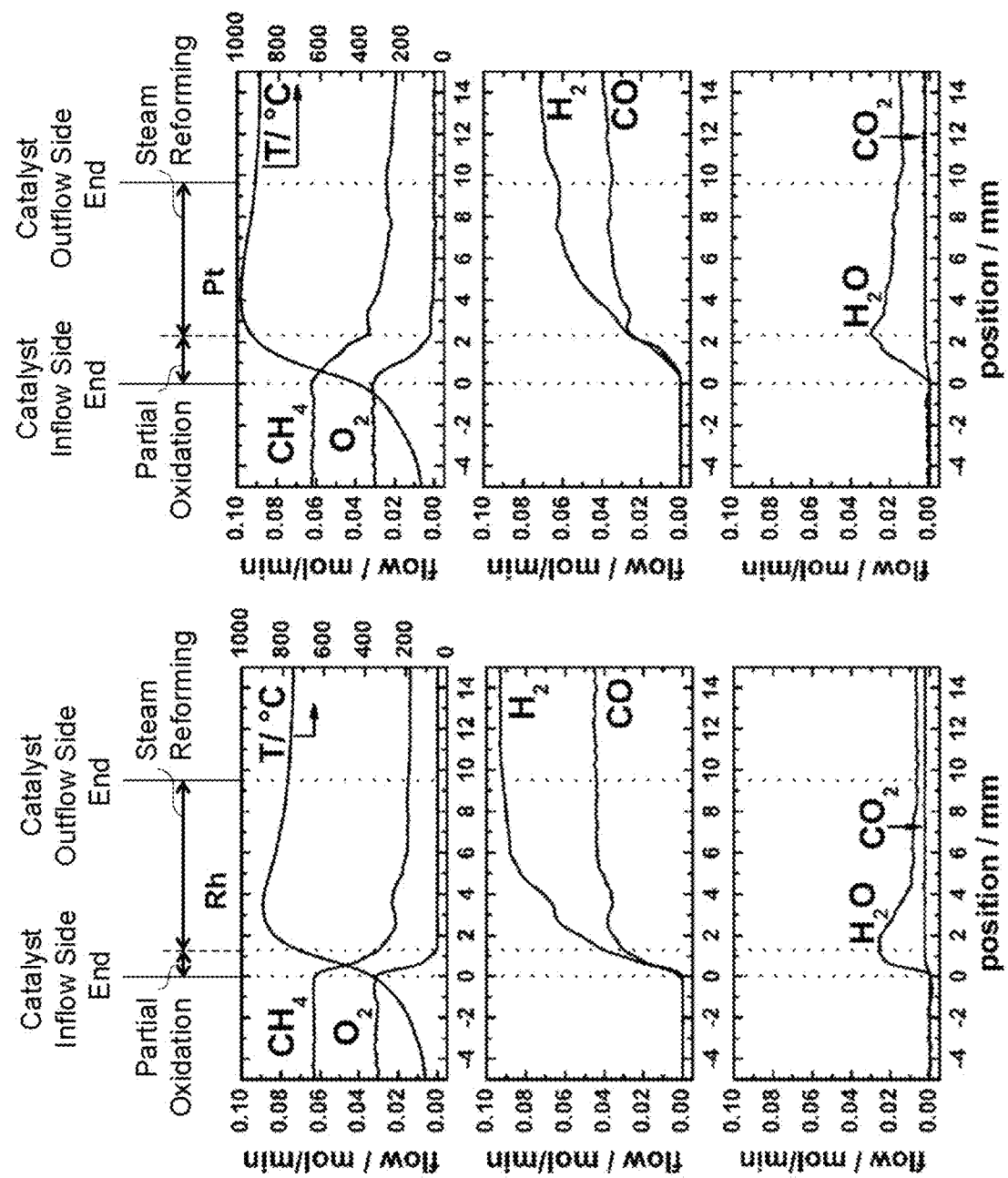
FIG. 8 is a drawing corresponding to FIG. 3 of the reference document and includes graphs, upper portion on the left side of which is a graph illustrating flow rates of $CH_4$ and $O_2$ and bed temperatures at respective positions in the flow direction of a supply gas of a reactor in which a Rh-containing catalyst is disposed, middle portion on the left side of which is a graph illustrating flow rates of $H_2$ and CO at the respective positions in the flow direction of the supply gas of the reactor in which the Rh-containing catalyst is disposed, and lower portion on the left side of which is a graph illustrating flow rates of $H_2O$ and $CO_2$ at the respective positions in the flow direction of the supply gas of the reactor in which the Rh-containing catalyst is disposed.

FIG. 8 is a drawing corresponding to FIG. 3 of the reference document, and the upper part on the left side is a graph illustrating flow rates of $CH_4$ and $O_2$ and bed temperatures at each position in the flow direction of the supply gas in the reactor in which the Rh-containing catalyst is arranged, the middle part on the left side is a graph illustrating flow rates of $H_2$ and CO at each position in the flow direction of the supply gas in the reactor in which the Rh-containing catalyst is arranged, and the lower part on the left side is a graph illustrating flow rates of $H_2O$ and $CO_2$ at each position in the flow direction of the supply gas in the reactor in which the Rh-containing catalyst is arranged. Also in FIG. 8, the upper part on the right side is a graph illustrating flow rates of $CH_4$ and $O_2$ and bed temperatures at each position in the flow direction of the supply gas in the reactor in which the Pt-containing catalyst is arranged, the middle part on the right side is a graph illustrating flow rates of $H_2$ and CO at each position in the flow direction of the supply gas in the reactor in which the Pt-containing catalyst is arranged, and the lower part on the right side is a graph illustrating flow rates of $H_2O$ and $CO_2$ at each position in the flow direction of the supply gas in the reactor in which the Pt-containing catalyst is arranged.

[Evaluation]

From the measurement results illustrated in FIG. 7 of Reference Example 1 and FIG. 8 of Reference Example 2, it is seen that the Pt-containing catalyst has a large heat generation by a partial oxidation and has a high $H_2O$ selectivity, and, is likely to easily oxidizes $CH_4$ to $CO_2$ in association with the further heat generation since the Pt-containing catalyst has a high catalyst bed temperature in all the ranges of C/O ratio compared to that of the Rh-containing catalyst. Meanwhile, it is seen that the Rh-containing catalyst has a small heat generation by the partial oxidation, but the steam reforming activity is high and the $H_2$ selectivity is high.

Accordingly, in the exhaust gas purification device in which the inflow cell side catalyst layer includes Pt and the outflow cell side catalyst layer includes Rh, Pt included in the inflow cell side catalyst layer can efficiently oxidize hydrocarbon (HC) of the exhaust gas with rich atmosphere, and therefore, it is considered possible to suppress the outflow cell side catalyst layer from being poisoned by HC with Ce as the starting point. When Pt oxidizes the HC, the heat generation is larger and the generation amount of $H_2O$ is larger than the case where Rh oxidizes the HC, and in addition, the steam reforming activity of the Rh is higher than that of Pt, and therefore, it is considered that the HC can be efficiently reformed with the outflow cell side catalyst layer.

While embodiments of the exhaust gas purification device of the present disclosure have been described in details, the present disclosure is not limited to the above-described embodiments, but various kinds of changes of design is allowed within a range not departing from the spirits of the present disclosure described in the claims.

All publications, patents and patent applications cited in the present description are herein incorporated by reference as they are.

DESCRIPTION OF SYMBOLS

1 Exhaust gas purification device
10 Honeycomb substrate
10Sa Inflow side end surface of honeycomb substrate
10Sb Outflow side end surface of honeycomb substrate
12 Cell
12A Inflow cell
12Aa Inflow side end of inflow cell
12Ab Outflow side end of inflow cell
12B Outflow cell
12Ba Inflow side end of outflow cell
12Bb Outflow side end of outflow cell
14 Partition wall
14a Inflow side end of partition wall
14m Predetermined position of partition wall
14b Outflow side end of partition wall
14Ra Inflow side region of partition wall
14Rb Outflow side region of partition wall
14Rr Overlapping region of partition wall
14SA Surface of inflow cell side of partition wall
14NA Inner region of inflow cell side of partition wall
14NB Inner region of outflow cell side of partition wall
16 Sealing portion
20 Inflow cell side catalyst layer
30 Outflow cell side catalyst layer

What is claimed is:
1. An exhaust gas purification device comprising:
a honeycomb substrate;
an inflow cell side catalyst layer, and
an outflow cell side catalyst layer,
wherein the honeycomb substrate includes a porous partition wall that defines a plurality of cells extending from an inflow side end surface to an outflow side end surface,
wherein the plurality of cells include an inflow cell and an outflow cell adjacent to one another with the partition wall interposed therebetween,
wherein the inflow cell has an open inflow side end and a sealed outflow side end,
wherein the outflow cell has a sealed inflow side end and an open outflow side end,
wherein the inflow cell side catalyst layer is disposed on a surface on the inflow cell side in an inflow side region from the inflow side end to a predetermined position on an outflow side of the partition wall,
wherein the outflow cell side catalyst layer is disposed in an inner region on the outflow cell side in an outflow side region from the predetermined position to the outflow side end of the partition wall,
wherein the thickness of the outflow cell side catalyst layer is within a range of 1% or more and 20% or less of the thickness of the partition wall, and
wherein when a gas permeability coefficient of an inflow side partition wall portion including the inflow side region of the partition wall and the inflow cell side catalyst layer is Ka and a gas permeability coefficient of an outflow side partition wall portion including the outflow side region of the partition wall and the outflow cell side catalyst layer is Kb, a ratio Ka/Kb of the gas permeability coefficients is within a range of 0.4 or more and 0.8 or less.

2. The exhaust gas purification device according to claim 1, wherein the inflow cell side catalyst layer includes a catalytic metal containing at least one of platinum (Pt) and palladium (Pd), and the outflow cell side catalyst layer includes a catalytic metal containing rhodium (Rh).

* * * * *